US005708337A

United States Patent [19]
Breit et al.

[11] Patent Number: 5,708,337
[45] Date of Patent: Jan. 13, 1998

[54] BRUSHLESS PERMANENT MAGNET MOTOR FOR USE IN REMOTE LOCATIONS

[75] Inventors: Stephen M. Breit; Harold John Shankwitz, both of Bartlesville, Okla.

[73] Assignee: Camco International, Inc., Houston, Tex.

[21] Appl. No.: 359,818

[22] Filed: Dec. 20, 1994

Related U.S. Application Data

[63] Continuation-in-part of Ser. No. 78,136, Jun. 14, 1993, abandoned.

[51] Int. Cl.$^6$ .............................................. H02K 13/00
[52] U.S. Cl. .................................. 318/439; 318/254
[58] Field of Search ............................... 318/254, 138, 318/439, 813, 815

[56] References Cited

U.S. PATENT DOCUMENTS

| | | | |
|---|---|---|---|
| 4,108,499 | 8/1978 | Sandberg | 318/489 |
| 4,288,737 | 9/1981 | McClain et al. | 318/815 X |
| 4,455,513 | 6/1984 | Fulton et al. | 318/696 X |
| 4,488,101 | 12/1984 | Studtmann | 318/811 X |
| 4,686,437 | 8/1987 | Langley et al. | 318/254 |
| 4,743,815 | 5/1988 | Gee et al. | 318/254 |
| 4,831,277 | 5/1989 | Christopher | 290/1 A |
| 4,928,043 | 5/1990 | Plunkett | 318/254 |
| 5,233,275 | 8/1993 | Danino | 312/254 |
| 5,343,127 | 8/1994 | Maiocchi | 318/439 X |

Primary Examiner—David S. Martin
Attorney, Agent, or Firm—Arnold & White & Durkee

[57] ABSTRACT

A brushless permanent magnet motor for use within a electric submergible pumping system is controlled without utilizing rotor position sensors, by sampling the voltage of the motor's windings. The operation of the motor is governed by control circuits that provide signals representative of the winding EMFs. The control circuits utilize an integrator, a offset corrector, and a crossover detector to simulate outputs received from Hall effect devices. Outputs from the control circuits are used to sequentially gate an array of commutation transistors to apply power to the different windings. These outputs are also used to develop a tachometer signal to regulate the speed of the motor, by controlling the supply voltage to the commutation transistors. Prior to starting the motor, the output bus voltage is permitted to rise from zero volts to a predetermined level. Then, the rotor rotates to a predetermined home position with regard to the stator. During this time, integrators are precharged to assist crossover detectors in establishing the initial timing relationship between the three motor phases. As the motor begins to rotate, the motor control is performed by detecting and processing winding EMFs, and operating the motor in a brushless D.C. mode.

28 Claims, 18 Drawing Sheets

BRUSHLESS PERMANENT MAGNET MOTOR FOR USE IN REMOTE LOCATIONS

CROSS-REFERENCE TO RELATED APPLICATION

This application is a continuation-in-part of U.S. application Ser. No. 08/078,136, entitled "Brushless Permanent Magnet Motor For Use in Remote Locations," filed on Jun. 14, 1993, abandoned, in the name of Harold John Shankwitz.

BACKGROUND OF INVENTION

1. Field of Invention

The present invention relates to brushless permanent magnet direct current (D.C.) motors. More particularly, the invention relates to a brushless permanent magnet motor for use within an electric submergible pumping system. Further, the invention relates to a brushless permanent magnet motor whose operation is controlled without utilizing rotor position sensors. To position the motor prior to rotation, simulated Hall effect signals are used. After rotation of the motor has been initiated, operation is conducted by sampling the EMF's of the motor's windings.

2. Description of Related Art

There exists a need to increase the overall operating efficiency of electric submergible pumping systems, which are used to recover valuable hydrocarbon fluids from subterranean reservoirs. One major component of an electric submergible pumping system that has proved difficult to improve is the electric motor. Currently, electric motors used within electric submergible pumping systems are typically induction motors with elongated stator windings. These motors are extremely long, such as over 30 feet in length, and are not capable of having their speed controlled without the use of add-on expensive variable speed drives.

The use of a permanent magnet motor, such as a brushless D.C. motor, within an electric submergible pumping system has heretofore not been operationally feasible due to the need to provide signals to the motor controller of the motor's rotor position, as will be described in detail below. These position signals would need to be sent back to the earth's surface through additional wires or cables. These additional wires and cables are to be avoided for cost reasons and because of the need to reduce or eliminate any extra items within a wellbore that can be damaged or negatively effected by the wellbore elevated temperatures, pressures and hostile chemicals.

When a brushless D.C. motor is operated most efficiently, it delivers maximum torque per ampere of current. Many applications determine whether a motor is providing maximum torque per ampere by sensing rotor position. This is accomplished by using some type of sensing device to provide a signal representative of the rotor's position. Many applications today utilize Hall effect sensors for this purpose.

When Hall effect sensors are used, it is important that the sensors have the proper angular displacement with respect to the stator windings. In practice, this angular displacement is typically measured by operating the motor as a synchronous generator and using an oscilloscope to measure (1) the outputs of the Hall effect sensors ("Hall outputs"); and (2) the voltages across the windings ("winding EMFs"). The Hall effect sensors are typically mounted on a printed circuit board fastened to the motor. By rotating this printed circuit board, one can adjust the angular setting between the Hall effect sensors and the stator windings.

To illustrate this further, it is helpful to discuss the relationship between the Hall outputs, the winding EMFs, and application of power to the windings in a particular switching arrangement 100 (FIG. 1). The arrangement 100 includes first, second, and third windings 102, 104, and 106. The windings are interconnected at a central node 108; additionally, the winding 104 is connected to a node X, the winding 102 is connected to a node Y, and the winding 106 is connected to a node Z. The windings 102, 104, 106 are switched by six commutation transistors X1, Y1, Z1, X2, Y2, and Z2 (referred to collectively as X1–Z2). The transistors X1–Z2 may be classified as source transistors (X1, Y1, and Z1) and return transistors (X2, Y2, and Z2). Commutation transistors such as the transistors X1–Z2 are often sold in packages of 1, 2, or 6 transistors, depending upon the transistors' ability to carry current. A positive bus 110 and a negative bus 112 supply voltage to the commutation transistors X1–Z2.

The operation of Hall effect sensors (not shown) in this context will be illustrated using "120° logic." This means that the Hall effect sensors are mounted at mechanical angles of 120° about the stator windings. The outputs of the Hall effect sensors are shown in FIG. 2, and include first, second, and third Hall outputs 202, 204, and 206, corresponding to the first, second, and third windings 102, 104, and 106. Generally, when a given stator winding is energized, this causes its associated Hall effect sensor to be activated. In the present example, the Hall effect sensors are digital; thus, the outputs 202, 204, and 206 alternate between logic 1 and 0 values.

Generally, the position of the Hall effect sensors is adjusted based upon the output of the Hall effect sensors shown in FIG. 2. After the Hall board has been adjusted properly, digital logic circuitry is used to operate the motor as a high efficiency brushless D.C. motor. In particular, the logic circuitry gates the transistors X1–Z2 in response to the Hall outputs 202, 204, 206 to enable the motor to produce maximum torque per ampere of current through the motor. The gating sequence is shown in FIG. 3, wherein each column represents one time interval, corresponding to 60 electrical degrees. These time intervals are identified by reference numbers 250, 252, 254, 256, and 258 (FIG. 2). Only two transistors are gated at once—one source transistor (X1, Y1, or Z1) and one return transistor (X2, Y2, or Z2). In the illustrated example, with a wye-connected winding, this permits current to flow through two windings simultaneously. By successively changing which transistors are gated, the magnetic field in the stator is also changed, causing the rotor to rotate accordingly.

To deliver the maximum torque per ampere, two windings should receive power from the time the winding EMF of that pair reaches a phase of 60° through the time when the winding EMF of that pair reaches a phase of 120°, where such phase measurements are made with respect to the time at which the signal crosses zero volts. For example, in interval 250 the winding output 402 (FIG. 4), which is the EMF from windings 104 and 106, is at its maximum with transistors X1 and Z2 on. In interval 256 winding output 402 is at its minimum when transistors X2 and Z1 are activated. Therefore, the winding output 402 is associated with the X and Z transistors, since the output 402 achieves its maximum and minimum values when either pair X1/Z2 or X2/Z1 are activated. Inspection of the other winding outputs 404, 406 similarly shows that they are necessarily associated with the transistors Y/Z and Y/X, respectively. For example, the output 404 achieves its maximum values when the transistors Y1 and Z2 are conducting, and its minimum values when the transistors Y2 and Z1 are conducting.

Referring to FIGS. 1–4, the manner in which the Hall outputs 202, 204, 206 are utilized to generate the transistor switching pattern of FIG. 3 will be explained. At any given time, two transistors are turned on: one source transistor X1–Z1 and one return transistor X2–Z2. The digital logic circuitry determines which transistors will be turned on next, depending upon the Hall outputs 202, 204, 206. Each Hall output 202, 204, 206 is associated with one of the source transistors and one of the return transistors, i.e. the pair X1/X2, Y1/Y2, Z1/Z2, respectively. When a Hall output rises, the source transistor that is currently on is turned off, and the source transistor corresponding to the Hall output that has risen is turned on. Likewise, when one of the Hall outputs falls, the return transistor that is currently on is turned off, and the return transistor corresponding to the Hall output that has fallen is turned on.

For example, in interval 250, the Hall output 204 rises. Since this output 204 is associated with transistors Y1/Y2, in the next interval 252 the source transistor that is currently on (i.e. X1) is turned off, and the source transistor associated with the output 204 (i.e. Y1) is turned on. Likewise, in interval 252, the Hall output 202 falls. Since this output 202 is associated with transistors X1/X2, in the next interval 254 the return transistor that is currently on (i.e. Z2) is turned off, and the source transistor associated with the output 204 (i.e. X2) is turned on.

Although arrangements utilizing Hall effect sensors have been found to be adequate in many applications, there are drawbacks associated with their use in other contexts, such as in pumping oil from oil wells. For example, there are serious limitations associated with using Hall effect sensors in remote locations such as in oil pumping operations, where the pumping motor is located "downhole." In particular, when Hall effect sensors are used in downhole pumping operations, long signal wires must be extended from the Hall effect sensors to the surface, so that electronic circuitry located outside the well can utilize the signals produced by the Hall effect sensors. Due to the length of these wires, unwanted noise and capacitance may be introduced into the system.

Furthermore, there is always a possibility that the cables might be accidentally severed during a downhole pumping operation due to vibration or other causes. This would then require removal of the pump from the hole at considerable expense and loss of time. Therefore, it is always desirable to use as few wires and cables as possible in such operations. Another problem in oil pumping operations is that Hall effect sensors are temperature sensitive, and tend to malfunction when exposed to temperatures exceeding 300° F. If such a malfunction occurs, the motor becomes inoperable, again requiring removal from the hole.

Without the use of Hall effect sensors, conventional brushless D.C. motors are complicated to start. For instance, known brushless D.C. motors without Hall sensor are typically started as synchronous motors using an inventor, and then advanced into brushless D.C. operation. This approach might be more complex than some applications require.

SUMMARY OF INVENTION

The present invention concerns a brushless permanent magnet motor for use within an electric submergible pumping system. Such a motor permits the electric submergible pumping system to be operated more efficiently due to the motor's ability to operate more efficiently than an induction motor of the same motor area, and due to the motor's ability to have its speed controlled without the need for the use of an expensive add-on variable speed drive. Additionally, with such a motor, higher horsepower can be generated for the same motor area or a far shorter motor can be made and still have the same horsepower.

The permanent magnet motor of the present invention is controlled by sampling the voltage of the motor's windings, instead of using rotor position sensors such as Hall effect sensors. Power is selectively and sequentially applied to the stator windings by commutation transistors, whose timing is controlled by directing simulated Hall effect signals to a commutation master circuit. The simulated Hall effect signals are created by three control circuits, each including an integrator, an offset corrector, and a crossover detector. To start the motor, the stator and rotor are aligned in a predetermined "home" position, while two of the integrators are precharged and the two corresponding offset correctors are disabled. Then, the motor is operated in a brushless D.C. mode.

The motor of the invention includes a stator and a permanent magnet rotor. Power applied to the stator is controlled by six commutation transistors electrically connected to the windings via power cables, which may be lengthy in downhole applications. The commutation transistors operate to selectively connect first and second voltage busses to the windings in accordance with timing signals generated by a commutation master circuit.

During ongoing operation of the motor, the input to the commutation master circuit is provided by three control circuits, which provide simulated Hall effect signals based on the winding EMFs. Each control circuit, which corresponds to a pair of commutation transistors, includes an integrator, an offset corrector, and a crossover detector.

The voltage across the busses is adjusted via pulsewidth modulation by a power supply circuit. The power supply circuit in an illustrative embodiment, includes a three-phase power supply, a rectifier, a pulsewidth modulator, a power filter, and a snubber. The power supply circuit is controlled by a supply voltage controller, which receives an indication of the motor's speed of rotation from a winding tachometer.

The invention also includes certain circuitry used in initiating operation of the motor. For instance, a position initiator measures the voltage across the busses, and provides signals to the supply voltage controller and a group of mode control circuits to assist in starting the motor. The mode control circuits operate a switch that (1) alternatively provides the commutating master circuit with preset voltage levels or signals from the control circuits, and (2) alternatively provides the supply voltage with the position initiator signal or the winding tachometer signal. The mode control circuits also control selective precharging of the integrators to ensure that the control circuits provide the proper simulated Hall effect signals to the commutation master circuit when the motor starts to rotate. Offset control circuits are provided to selectively disable the offset correctors while the integrators are being precharged. An over-current compensator circuit is also included to detect the current supplied by the power supply circuit and to provide a signal to disable the power supply circuit when the current is excessive. Moreover, a relay may be included to selectively introduce a current limiting resistor into the power supply circuit to reduce the stress placed on the commutating transistors and windings prior to starting the motor.

The invention may be operated, in an illustrative embodiment, in a startup mode and a brushless D.C. mode. In the brushless D.C. mode, the control circuits provide electrical signals resembling those that would be received from Hall effect sensors. These signals are indicative of the voltage across the windings. A switch directs this information to the commutation master circuit, which selectively applies power to the gates of the appropriate commutation The winding tachometer provides the supply voltage controller with an electrical signal representative of the rotor's rate of revolution. The supply voltage controller uses the signal from the winding tachometer in providing input to the pulsewidth modulator to regulate the voltage applied to the positive and negative busses across the commutation transistors.

The initial startup of the motor, called the "startup mode" is controlled in a different manner. First of all, the current limiting circuit is effective in the startup mode to limit the level of current passing through the busses, thereby decreasing the initial stress placed on the transistors and the windings. Additionally, after the voltage across the busses increases to a certain level, the mode control circuits and offset control circuits begin a series of events. First, the integrators are precharged and the offset connectors are disabled to provide a proper input for the commutation master circuit for initiating the brushless D.C. mode of operation. At this time, the commutation master circuit does not receive input from the control circuits, however. Instead, the switch receives preset startup voltages, and directs these signals to the commutation master circuit. This has the effect of aligning the rotor in a desired "home" position with respect to the stator. Also at this time, the supply voltage controller receives input from the position initiator to assist in regulating the voltage across the busses.

Next, the switch is tripped, directing the output of the winding tachometer, instead of the position initiator, to the commutation master circuit. Also, as a result of tripping the switch, the precharged outputs of the control circuits, instead of the preset startup voltages, are directed to the commutation master circuit. This causes the commutation transistors to be gated. Additionally, the mode control circuits assist the voltage controller in regulating the length of pulses provided by the pulsewidth modulator. Finally, the selected offset correctors are enabled at appropriate times, and the current limiting circuit is disabled.

BRIEF DESCRIPTION OF THE DRAWINGS

The nature of the invention, as well as its objects and advantages, will become more apparent to those skilled in the art after considering the following detailed description in connection with the accompanying drawings, in which like reference numerals designate like parts throughout, wherein.

DESCRIPTION OF A PREFERRED EMBODIMENT

Structure

Figure 15:
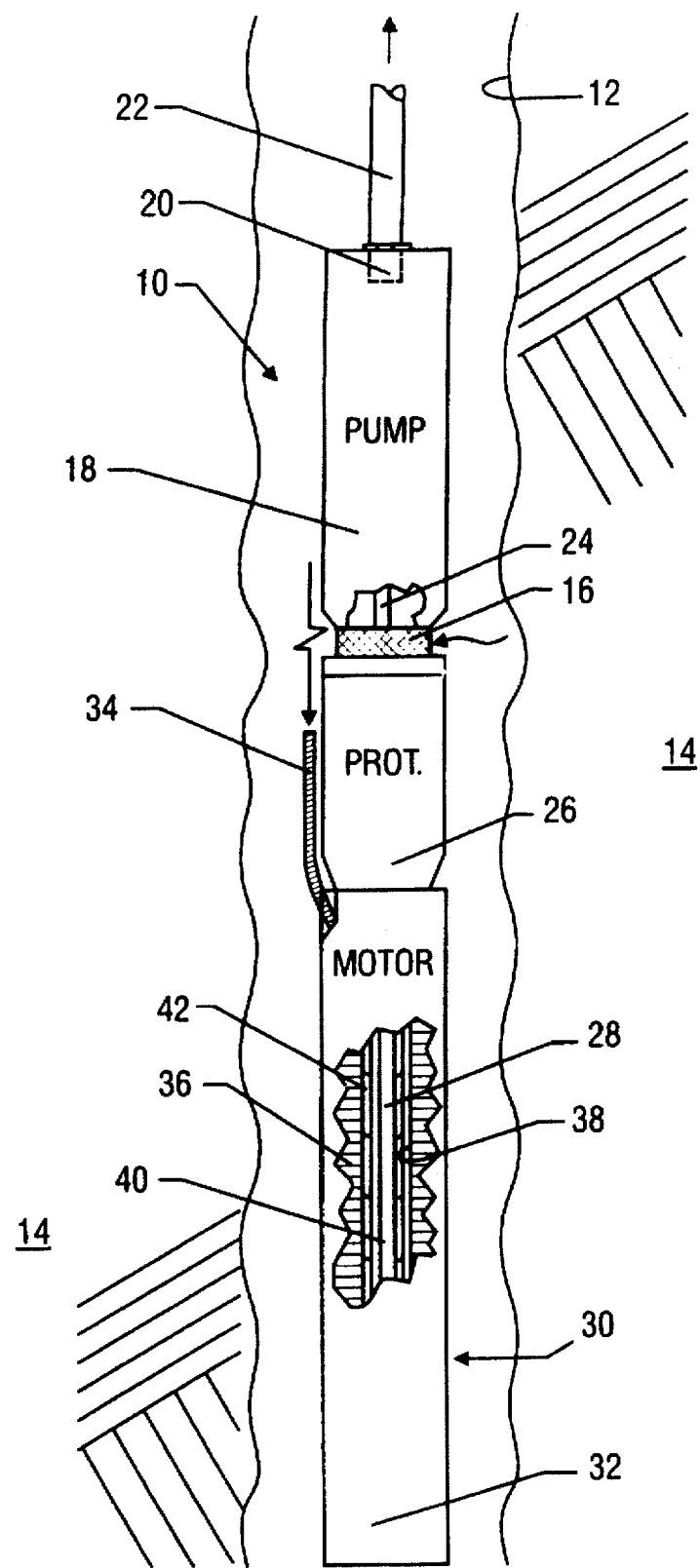
FIG. 15 is a side elevational view in partial cross-section of an electric submergible pumping system that includes one preferred embodiment of a multi-pole brushless electric motor of the present invention.

As shown in FIG. 15, an electric submergible pumping system 10 is shown suspended within a wellbore 12, which penetrates one or more subterranean hydrocarbon-bearing formations 14. Hydrocarbon fluids enter the wellbore 12 and are drawn into a pump inlet 16 of a rotary pump 18, and are discharged therefrom through a fluid outlet 20. A tubing 22 is connected across the outlet 20 and conveys the fluids to the earth's surface for processing, as is well known to those skilled in the art. The rotary pump 18 can preferably be a progressive cavity pump useful for moving viscous liquids and/or fluids with a relatively large sand content. Also, the rotary pump 18 can preferably be a multi-stage centrifugal pump, as is well known to those skilled in the art.

An internal shaft 24 is operatively connected through a motor protector 26 to a rotor shaft 28 of an electric motor 30. The electric motor 30 is preferably comprised of an elongated housing 32 with an opening in the side thereof for accepting an electrical power cable 34, that supplies electrical current from a power source at the earth's surface to windings 36 within the housing 32. The windings 36 comprise a plurality of plates or laminations with coils wrapped therearound, and define a central longitudinal opening 38 therein. A longitudinally extending shaft or rotor 40, having a plurality of permanent magnets 42 mounted thereon, extends through the opening 38. A first or upper end of the rotor 40 is operatively connected to the pump's shaft 24 to provide rotary motion thereto.

Figure 1:
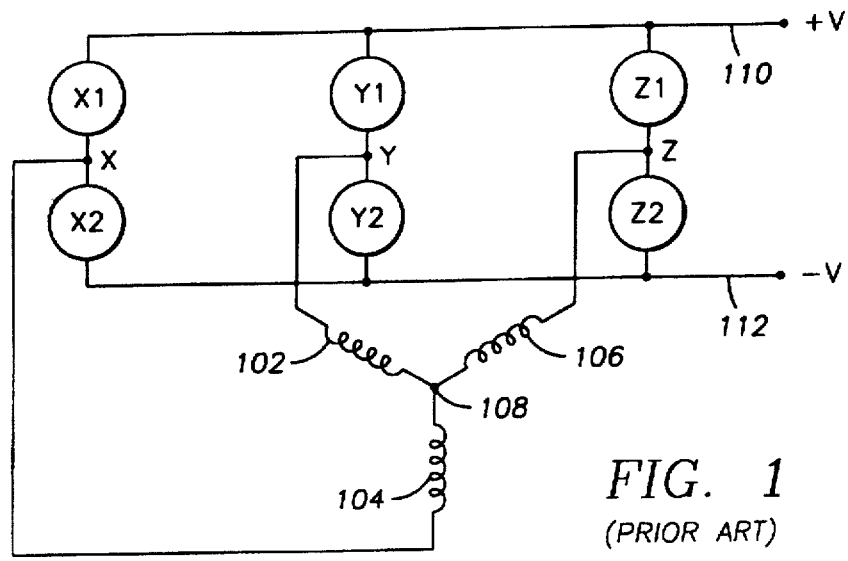
FIG. 1 is a schematic diagram illustrating a typical switching arrangement for a brushless D.C. motor.
Figure 5B:
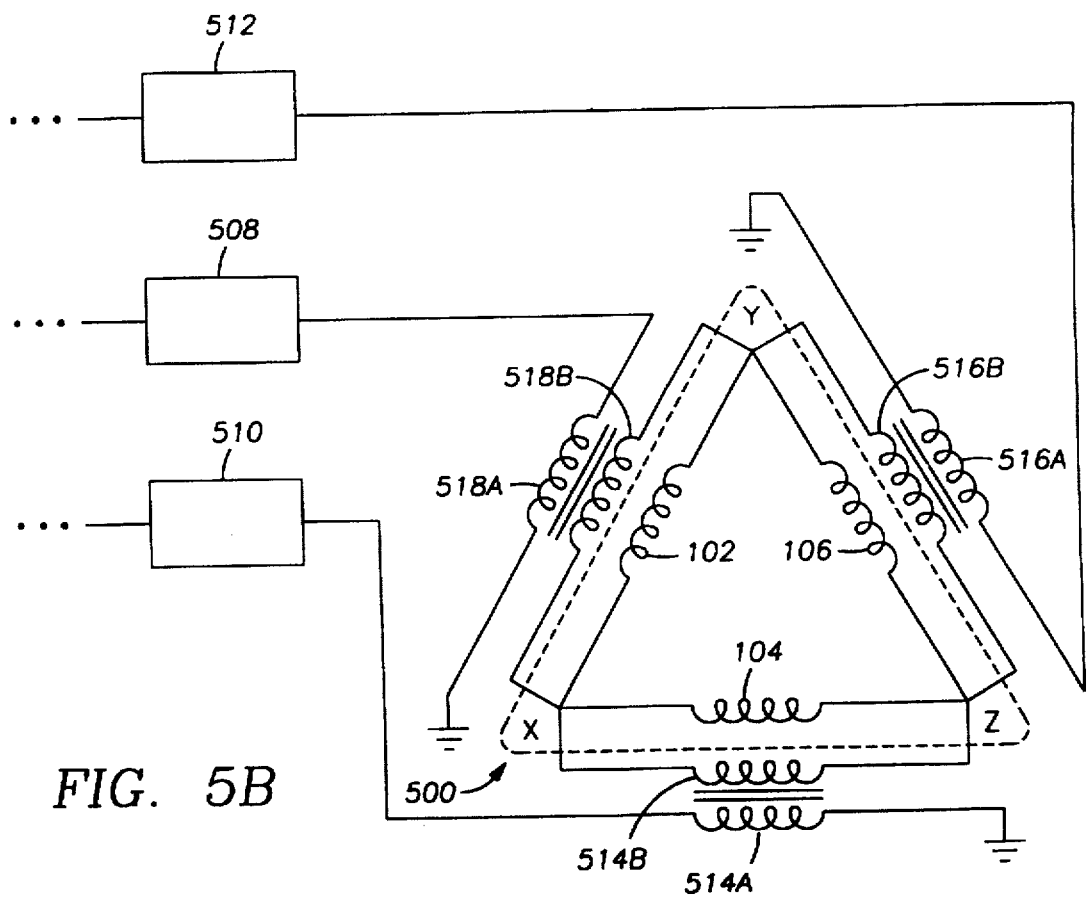
FIG. 5B is a schematic diagram illustrating a delta configuration of windings 102, 104, 106 in accordance with the invention.
Figure 5A:
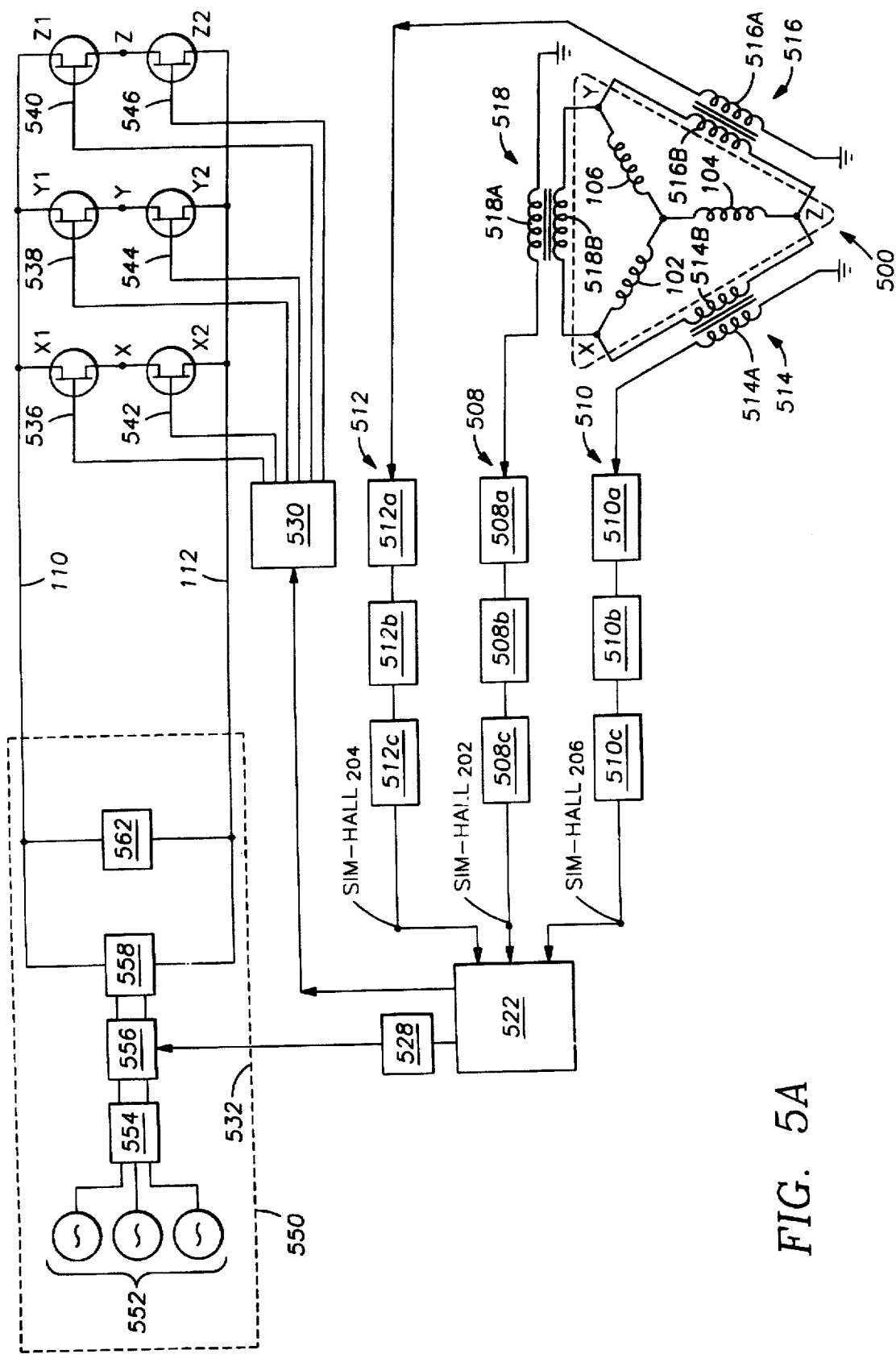
FIG. 5A is a block diagram illustrating hardware components and interconnections of the present invention.

The details of the permanent magnet motor of the present invention will now be described in detail. In accordance with the present invention, and as shown in FIG. 5A, a motor is provided, having a permanent magnet rotor (not shown) and a stator 500 that includes three windings 102, 104, and 106. In an exemplary embodiment of the invention, the windings may be wye-connected, as shown in FIG. 5A. The magnets of the permanent magnet rotor may be manufactured from a number of different substances, such as ferrite, neodymium, or a rare earth material. In a preferred embodiment, samarium cobalt is used, due to its magnetic characteristics and temperature stability. Samarium cobalt magnets are currently available from sources such as I.G. Technologies/

Ugimag (Valpariso, Ind.), Crucible Magnetics (Elizabethtown Ky.), and Hitachi Magnetics (Edmore, Mich.).

In a preferred embodiment, when the motor is operated as a brushless D.C. motor, power is applied to the stator 500 is controlled by six commutation transistors X1, X2, Y1, Y2, Z1, and Z2. A node X is defined between the transistors X1 and X2; similarly, a node Y is defined between the transistors Y1 and Y2; also, a node Z is defined between the transistors Z1 and Z2. The nodes X, Y, and Z are also electrically connected to the windings 102, 106, 104, respectively, via power cables (not shown). If desired, these power cables may be of considerable lengths, to facilitate remote operation of the motor 500. For example, if the motor 500 is used in certain downhole drilling operations, the power cables may be thousands of feet long.

The commutation transistors X1–Z2 may comprise commercial grade transistors comprising MOSFETs, Darlington transistors, insulated gate field effect transistors (IGFETs), or any other type of transistor capable of controlling currents of large magnitude through the windings 102, 104, 106. To operate the motor, the commutation transistors X1–Z2 are turned on and off by a commutation master circuit 530 in response to three control circuits 508, 510, and 512. As described in greater detail below, the control circuit 510 corresponds to the transistors X1 and X2, the control circuit 512 corresponds to the transistors Y1 and Y2; and the control circuit 508 corresponds to the transistors Z1 and Z2.

The control circuit 510 receives its input from a transformer 514, having a primary coil 514b and a secondary coil 514a, wherein the primary coil 514b is electrically connected between the nodes X and Z (i.e., across the windings 102 and 104). The control circuit 512 receives its input from a transformer 516, having a primary coil 516b and a secondary coil 516a, wherein the primary coil 516b is electrically connected between the nodes Z and Y (i.e., across the windings 104 and 106). The control circuit 508 receives its input from a transformer 518, having a primary coil 518b and a secondary coil 518a, wherein the primary coil 518b is electrically connected between the nodes X and Y (i.e., across the windings 102 and 106).

In some applications, the transformers 514, 516, 518 may be connected directly across the corresponding windings. However, in applications such as downhole drilling operations, where the motor 500 is remotely located, it may be desirable to couple the transformers 514, 516, 518 to equivalent electrical nodes near the commutation transistors X1–Z2 or the power cables, rather than directly at the windings 102, 104, 106. In this arrangement, all circuitry of the invention may be located together and connected to the remotely located motor 500 solely by the three power cables that extend between the commutation transistors X1–Z2 and the windings 102, 104, 106.

In an alternate embodiment, the windings 102, 104, 106 may be delta-connected instead of wye-connected. As an example of this embodiment (FIG. 5B), the transformers 518, 514, 516 may be coupled directly across the windings 102, 104, 106.

Referring again to FIG. 5A, each control circuit 508, 510, 512 is electrically connected to a respective transformer 518, 514, 516, which samples the EMF of one or more windings. The control circuit 508 includes an integrator 508a, an offset corrector 508b, and a crossover detector 508c. Likewise, the control circuits 510, 512 include integrators 510a, 512a, offset correctors 510b, 512b, and crossover detectors 510c, 512c. The control circuits 508, 510, and 512 are electrically connected to a switch 522.

Additionally, the invention preferably includes a supply voltage controller 528, which operates in conjunction with a power supply circuit 550 to provide an adjustable D.C. voltage across the busses 110, 112 via pulsewidth modulation. The power supply circuit 550, the operation of which is described in greater detail below, includes a three-phase power supply 552, a rectifier 554, a pulsewidth modulator 556, a power filter 558, and a snubber 562.

The electronic circuitry of the invention receives D.C. electrical power from a logic power supply (not shown) that receives A.C. electrical power from one phase of the three-phase power supply 552 and converts the A.C. power to D.C. power. The logic power supply may employ a single transformer (not shown) having multiple secondaries (not shown) along with smoothing circuitry such as rectifiers (not shown) to generate the different D.C. voltages required by the circuitry of the invention. Alternatively, the electronic circuitry of the invention may receive electrical power in accordance with other schemes that are well-known to those in the art.

Figure 2:
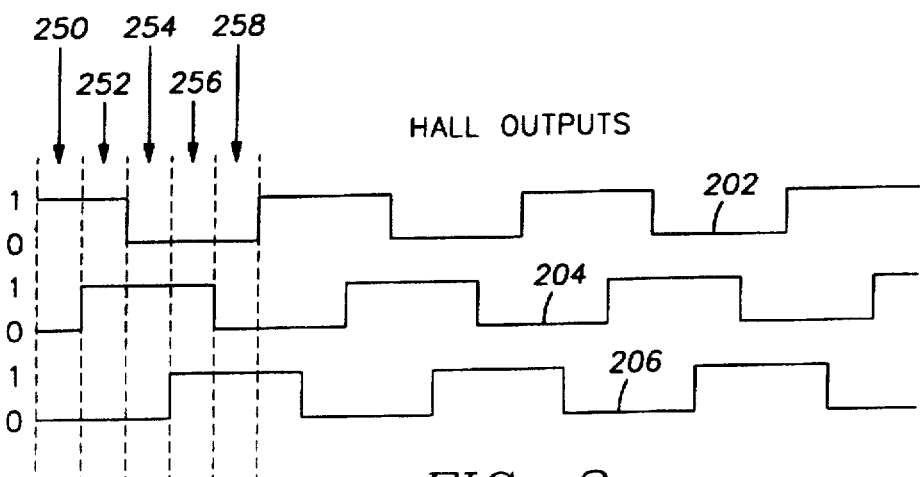
FIG. 2 is a diagram illustrating typical outputs from three Hall effect sensors utilized with the three-phase motor of FIG. 1.
Figure 6A:
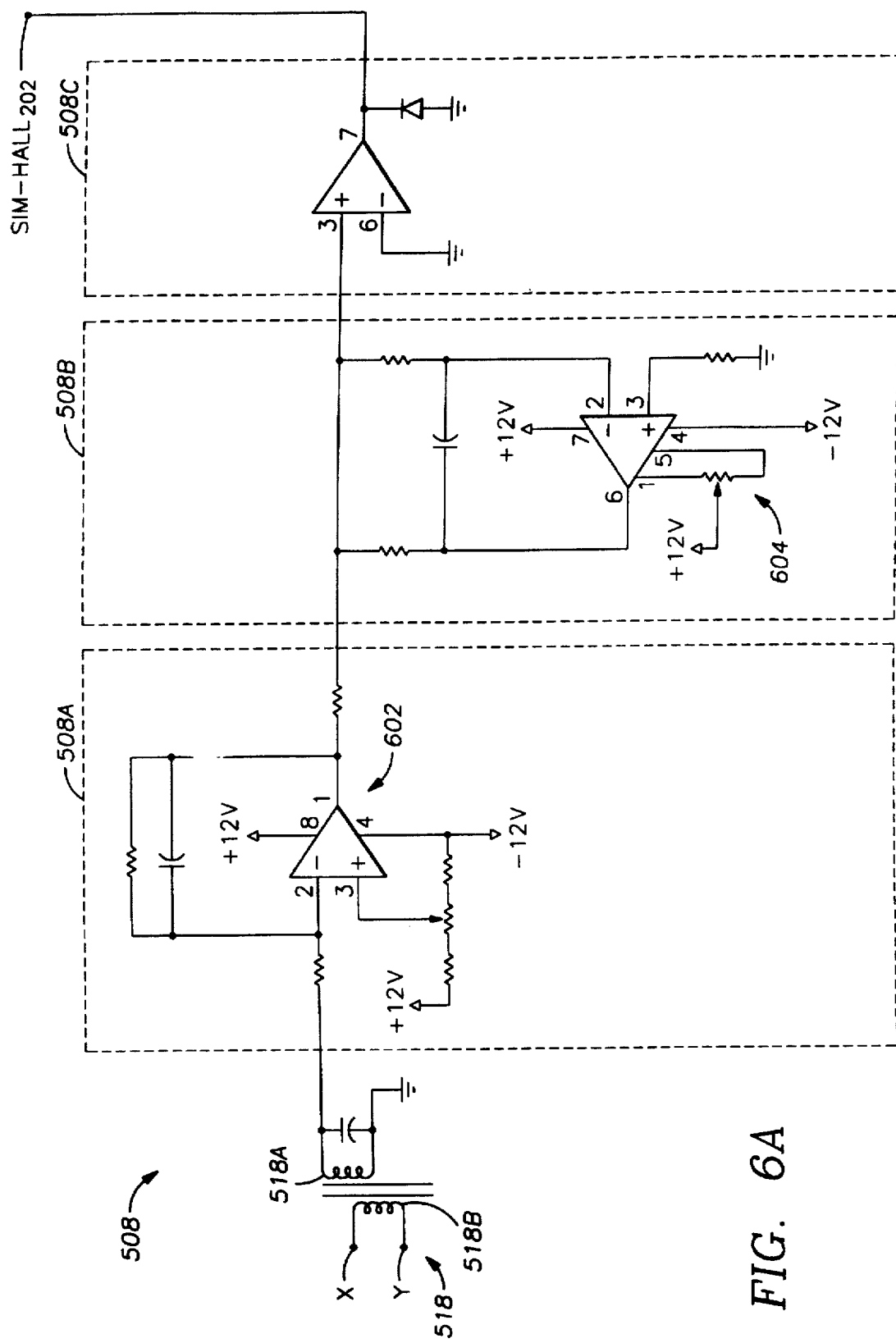
FIGS. 6A, 6B, and 6C are detailed schematic diagrams of control circuits 508, 512, and 510 of the invention.
Figure 6B:
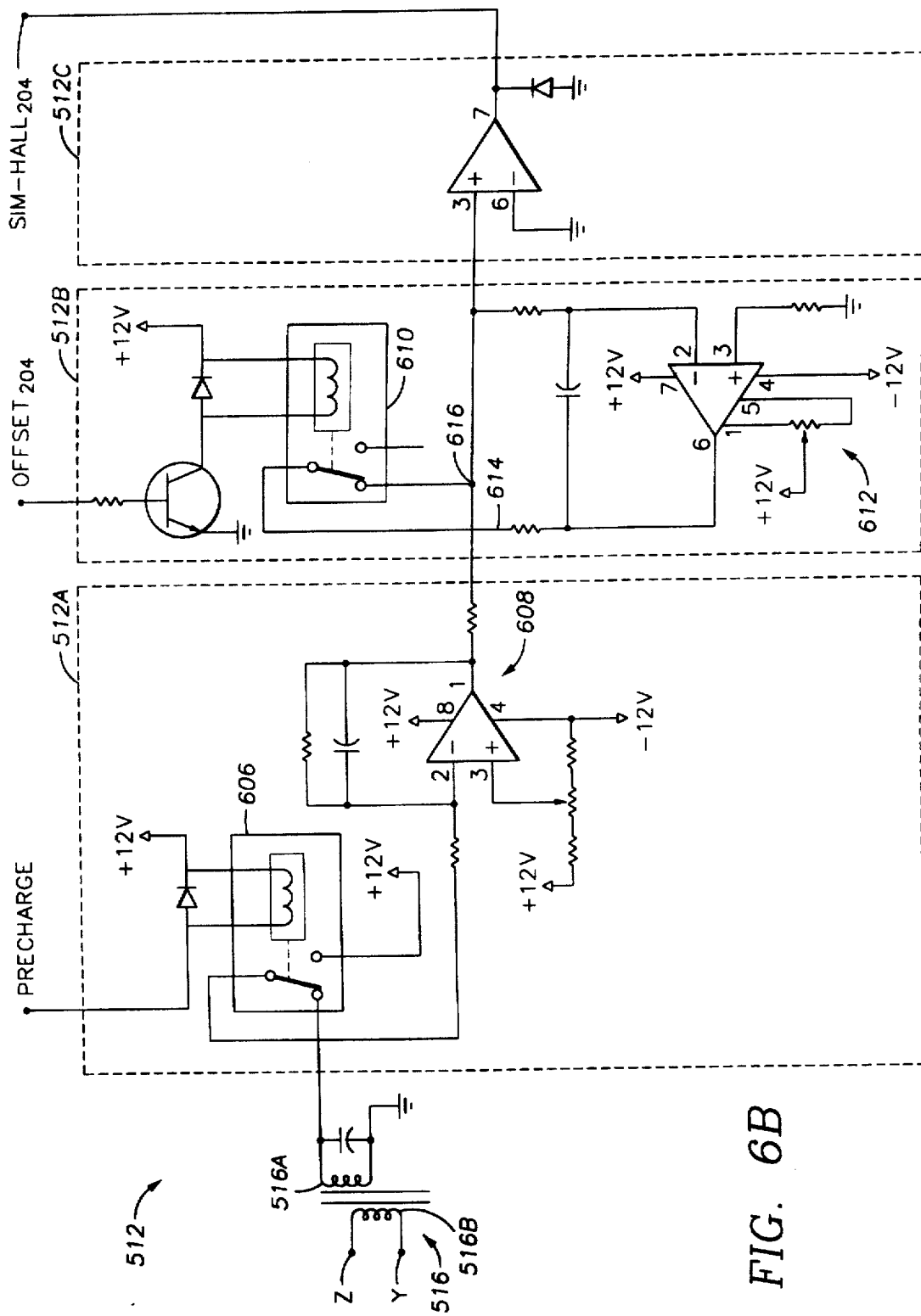
Figure 6C:
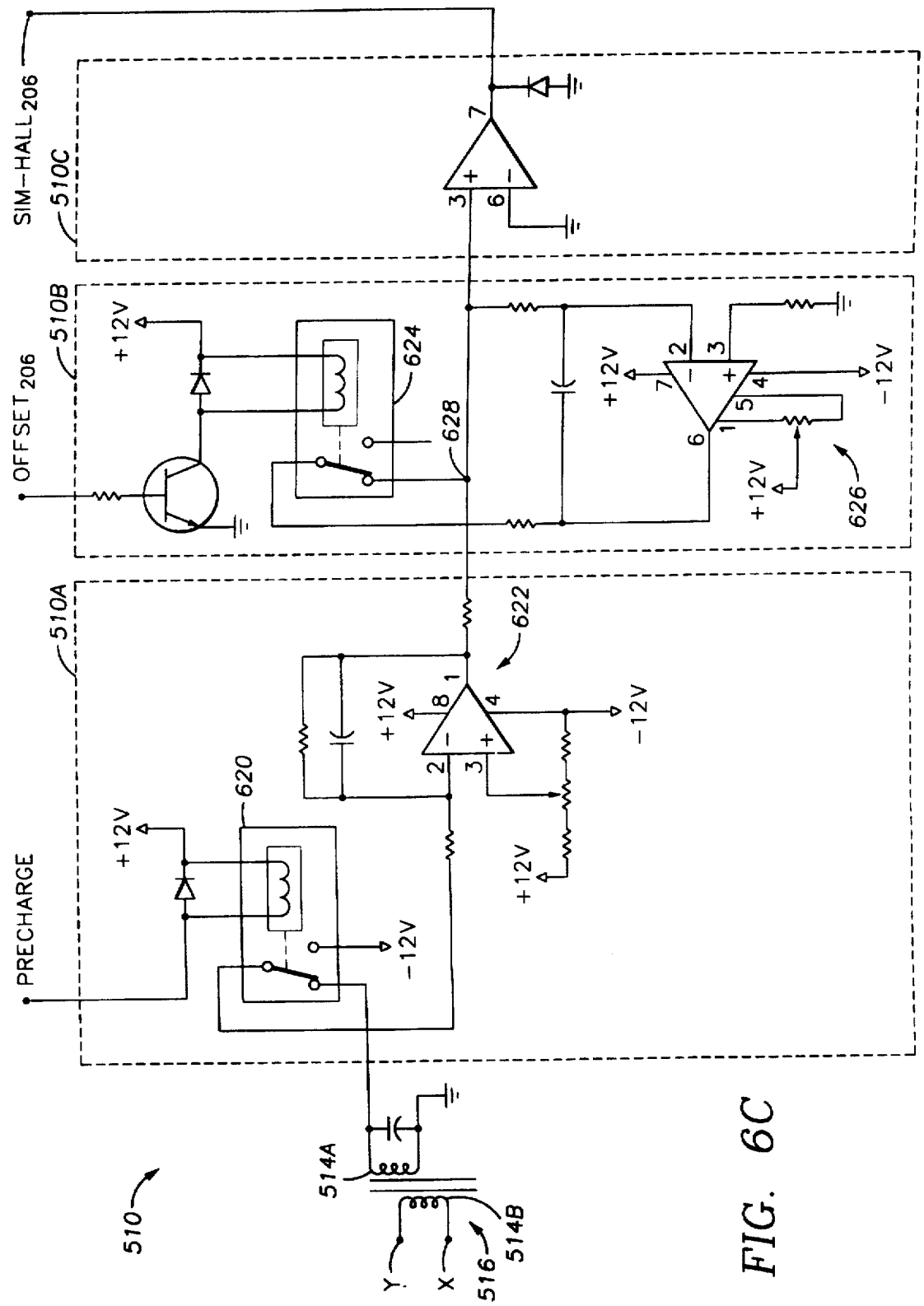
Figure 7:
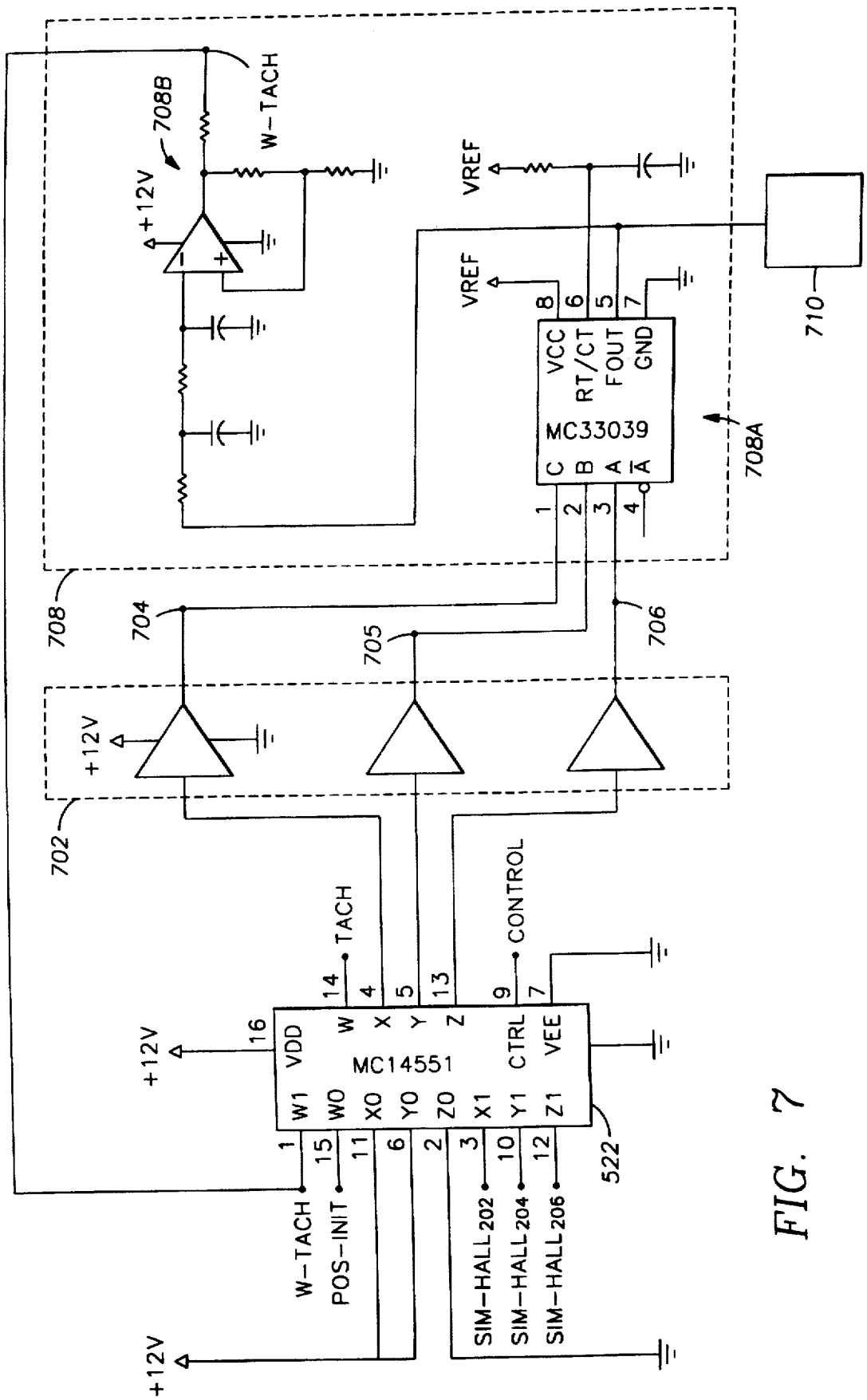
FIG. 7 is a detailed schematic diagram of a switch 522 and a winding tachometer 708 of the invention.

Referring to FIGS. 6A–12, the electrical components of FIGS. 5A–5B will be described in greater detail. In an exemplary implementation of the control circuit 508 (FIG. 6A), the integrator 508a includes an integrating amplifier 602 to effectively integrate the signal received from the secondary 518a. In an illustrative embodiment, the integrating amplifier 602 may comprise a model CA3240A amplifier configured as an integrator, or another arrangement with similar functions. The offset corrector 508b includes an offset amplifier 604 to remove any D.C. offset voltage from the output of the integrator 508a. The offset corrector 508b may, in an illustrative embodiment, comprise a model LF356J circuit. The control circuit 508 also includes a crossover detector 508c to identify when the offset corrector's output passes through zero volts. The crossover detector 508c may comprise, for example, a model CA3240A circuit. In a preferred embodiment, the control circuit 508 provides a digital output signal SIM-HALL$_{206}$ that is directed to the switch 522 (FIG. 7). The SIM-HALL$_{206}$ is named as such, for ease of explanation, to emphasize that it provides a simulated Hall output, resembling the Hall signal 206 of FIG. 2.

Like the control circuit 508, the control circuits 510 and 512 contain integrators, offset correctors, and crossover detectors (FIGS. 6B–6C). And, like the control circuit 508, the control circuits 510 and 512 provide digital output signals SIM-HALL$_{204}$ and SIM-HALL$_{202}$, respectively, which are directed to the switch 522. The SIM-HALL$_{204}$ and SIM-HALL$_{204}$ signals are named as such, for ease of explanation, to emphasize that they provide simulated Hall outputs, resembling the Hall signals 204 and 202 (respectively) of FIG. 2.

However, the control circuits 512, 510 include certain additional switching circuitry. Referring to FIG. 6B, the integrator 512a includes a relay 606 that is interposed between its integrating amplifier 608 and its transformer 516. The relay 606 is activated and deactivated in response to signals on a PRECHARGE line, the origin of which is described in greater detail below. A low voltage signal on the PRECHARGE line causes the relay 606 to electrically connect the integrating amplifier 608 to the transformer 516; a high voltage on the PRECHARGE line causes the relay 606 to electrically connect the integrating amplifier 608 to a selected positive D.C. supply voltage such as +12 V.

The control circuit 512 also includes a second relay 610 to selectively enable the offset amplifier 612 of the offset corrector 512b. The relay 610 is activated and deactivated in response to signals on an $OFFSET_{204}$ line, the origin of which is explained in greater detail below. A high voltage signal on the $OFFSET_{204}$ line causes the relay 610 to electrically connect a line 614 of the offset amplifier 612 to an output node 616. In contrast, a low voltage on the $OFFSET_{204}$ line causes the relay 610 to electrically disable the offset amplifier 612 by disconnecting it from the output node 616.

As shown in FIG. 6C, the control circuit 510 includes similar components as the control circuit 512. However, the offset amplifier 626 of the control circuit 510 is activated and deactivated in response to an $OFFSET_{206}$ line, which is explained in greater detail below. Like the integrator 512a, the integrator 510a is responsive to a low voltage signal on the PRECHARGE line, causing a relay 620 to electrically connect an integrating amplifier 622 to the transformer 514. However, unlike the integrator 512a, a high voltage on the PRECHARGE causes the relay 620 to electrically connect the integrating amplifier 622 to a selected negative D.C. supply voltage such as −12 V.

An alternative embodiment is contemplated wherein the control circuit 508 also includes circuitry (not shown) for precharging its integrator 508a, as well as circuitry (not shown) to disable its offset corrector 508b. Such circuitry may be used to provide an $SIM-HALL_{206}$ signal corresponding to the motor's "home" position, for use upon motor startup. However, it has been found that precharging of two integrators is sufficient to synchronize the starting of the motor. It is also understood that any two integrators may be precharged, i.e., not necessarily the integrators 512a and 510a.

Referring to FIG. 7, the switch 522 may, in an illustrative embodiment, comprise a three-pole double throw switch, such as a model MC14551 circuit. The switch 522 is electrically connected to a buffer 702, which preferably comprises three model MC14050 buffers, which remove noise from the outputs of the switch 522. The switch 522 generally operates like a multiplexer, by selectively connecting either the W0, X0, Y0, Z0 inputs or the W1, X1, Y1, Z1 inputs to the W, X, Y, and Z outputs, respectively, depending upon the value of the CONTROL signal.

The outputs 704–706 of the buffer 702 are directed to the commutation master circuit 530, which is described in greater detail below in conjunction with FIGS. 10A–10B. The outputs 704–706 of the buffer 702 are additionally connected to a winding tachometer 708, which comprises a filter 708a and an amplifier 708b. The filter 708a may comprise a model MC33039 digital-to-analog filter, and the amplifier 708b may comprise a model LM393N amplifier. The filter 708a receives the three outputs 704–706 from the buffer 702 and provides an output comprising a series of spikes corresponding to edges of the rectangular wave outputs of the buffer 702.

The output of the filter 708a is coupled to a display tachometer 710, such as an indicator that utilizes an analog needle or a digital display to provide a reading of revolutions per minute. The output of the filter 708a is also directed to the amplifier 708b, which smooths the spiked output and provides a D.C. electrical signal (W-TACH) indicative of the speed of rotation of the motor. Thus, the tachometer 708 is called the "winding" tachometer since it provides an indication of the speed of the motor's rotation based upon the voltages present across the windings 102, 104, 106. The output W-TACH of the amplifier 708b is directed to the switch 522; therefore, depending upon the CONTROL input to the switch 522, the output W-TACH may be selectively directed via the switch 522 to the TACH input of the supply voltage controller 528.

Figure 8A:
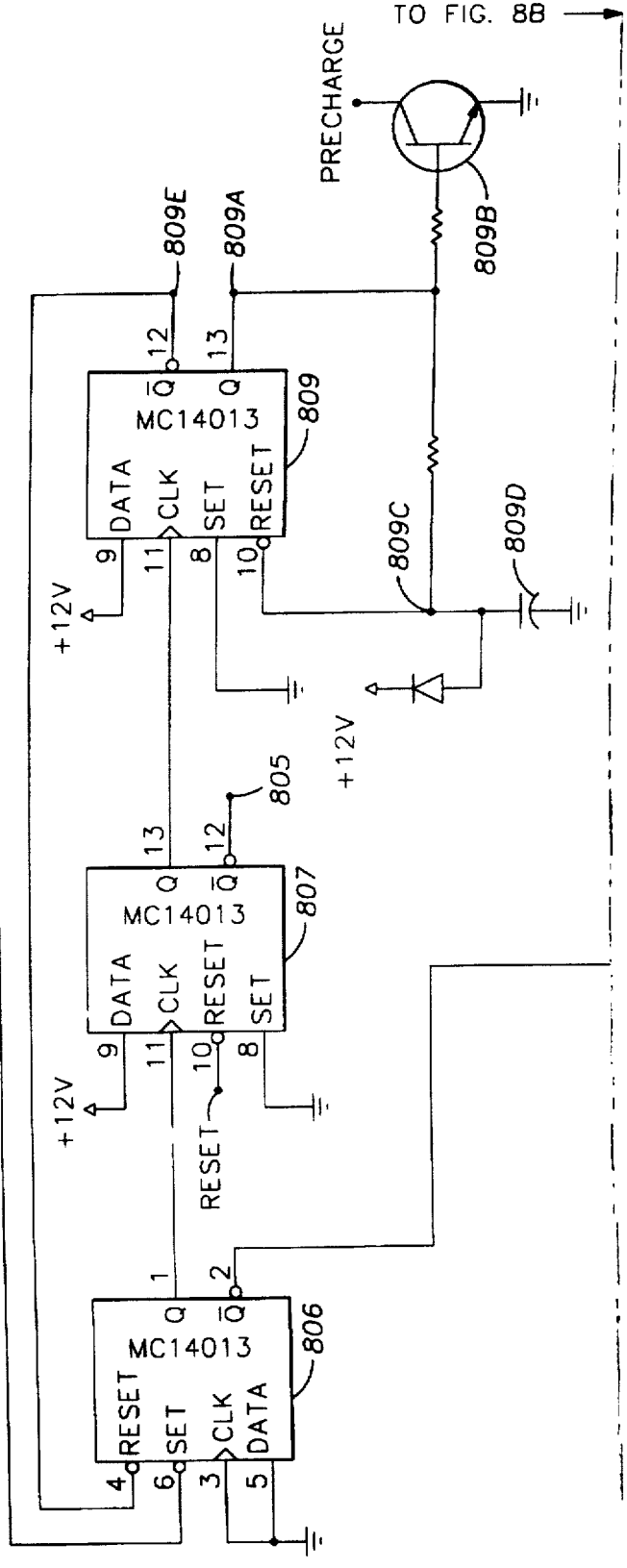
FIGS. 8A and 8B are detailed schematic diagrams of a position initiator 802, mode control set circuit 804, mode control circuits 806–809, and offset control circuits 813, 814 of the invention.
Figure 8A:
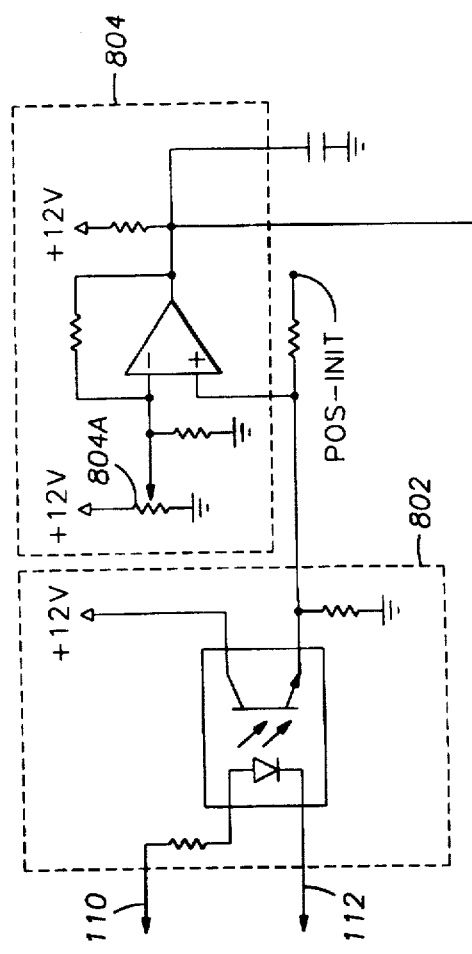
Figure 8B:
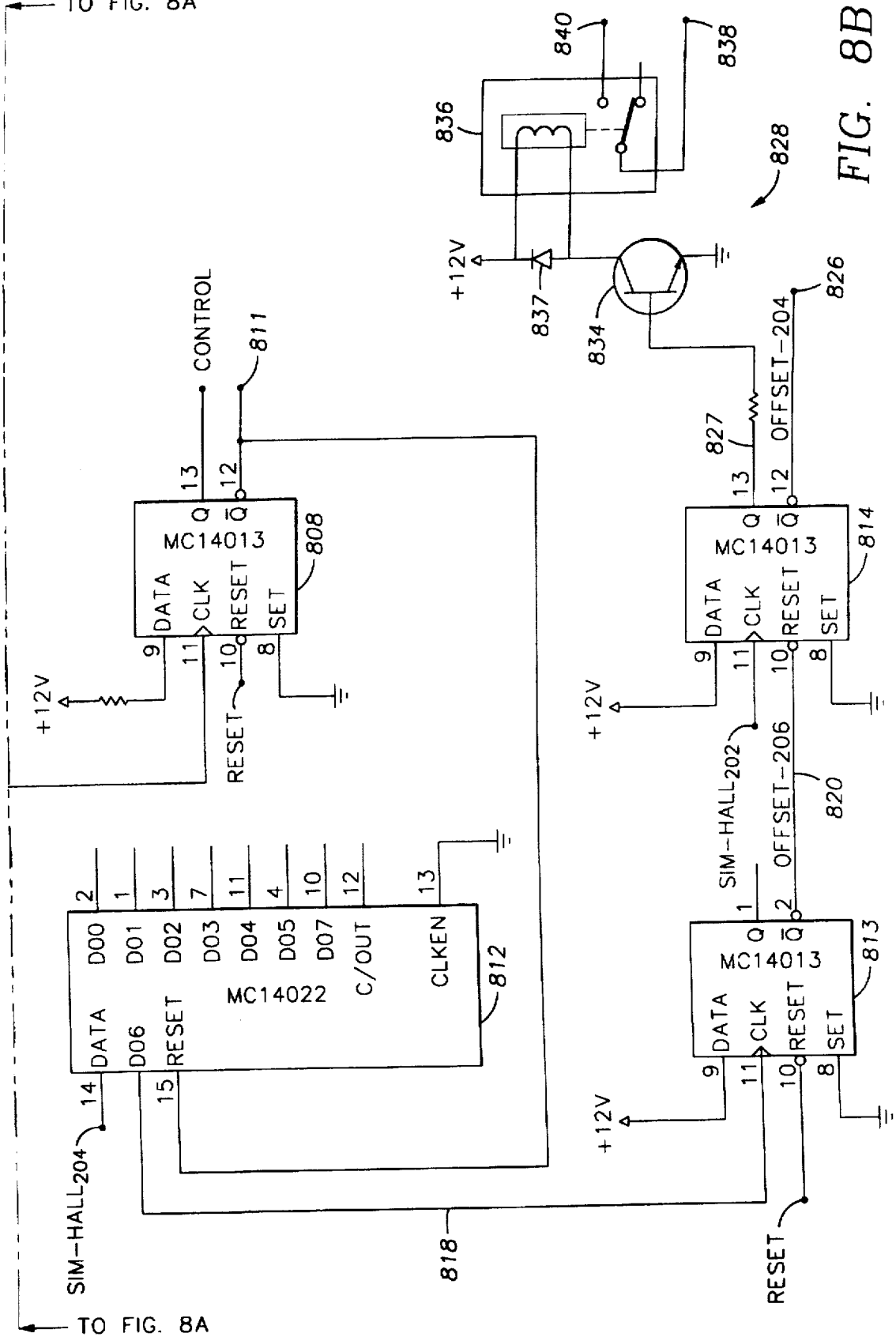

As shown in FIGS. 8A–8B, the invention also includes a position initiator 802, which operates to measure the voltage across the busses 110, 112, and provide an indication of this voltage to the switch 522. The position initiator 802 may comprise an optic coupler such as a model NEC2501 optic coupler. The output of the position initiator 802 (POS-INIT) is fed to the switch 522 and to a mode control set circuit 804.

Figure 11:
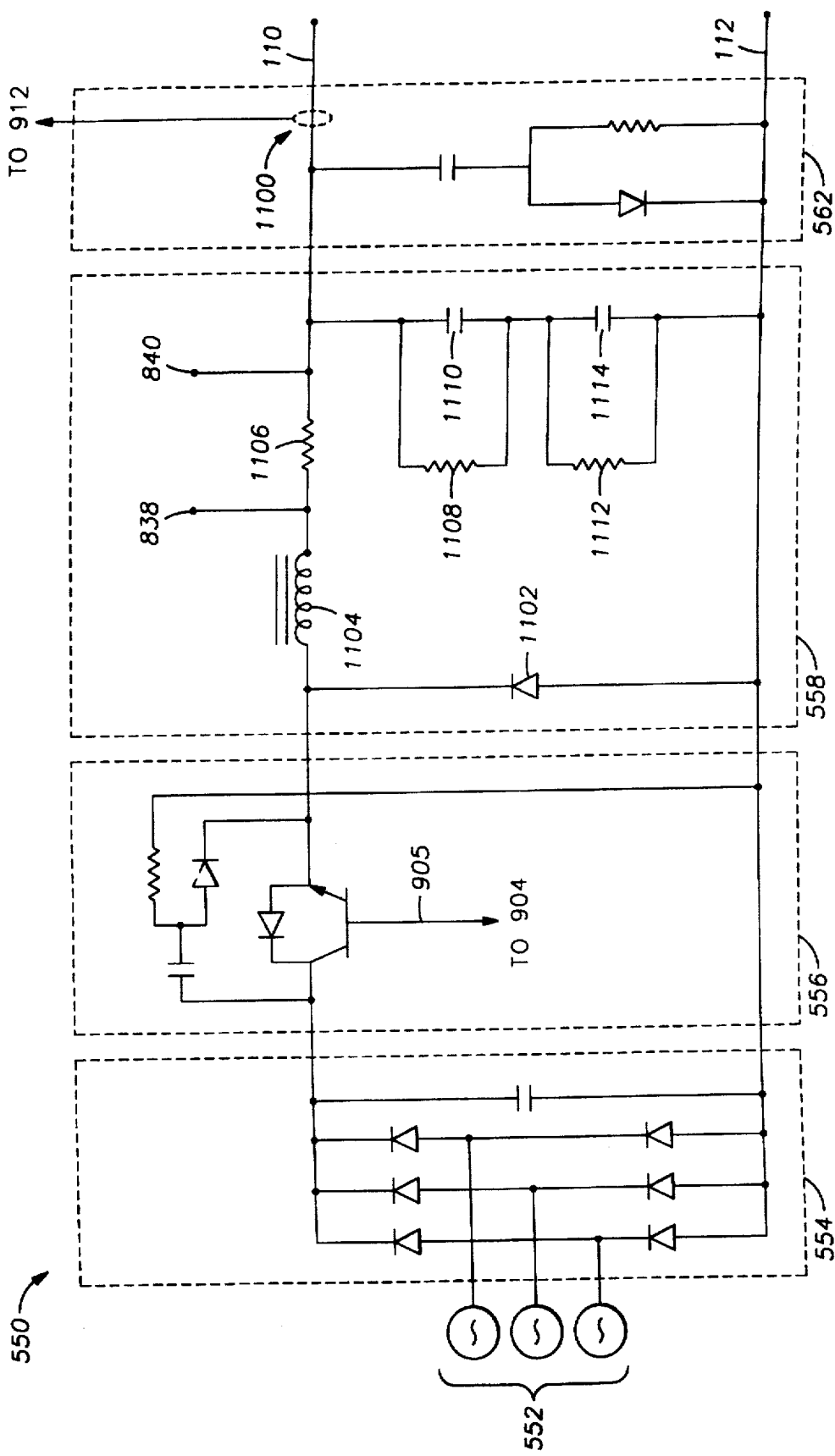
FIG. 11 is a detailed schematic diagram of a power supply circuit 550 of the present invention.

Referring to FIGS. 7 and 8A–8B, the invention includes mode control circuits 806–809, which perform a number of important functions. The circuit 808, for example, develops a CONTROL signal that is used to control the switch 522, thereby switching the motor from a startup mode to a brushless D.C. mode. The circuit 808 also provides an output 811, which assists the voltage controller 528 in regulating the length of pulses provided by the pulsewidth modulator 556 (FIGS. 9B, 11). The circuit 807 temporarily disables the commutation master circuit 530 while the voltage across the busses 110, 112 is building. The circuit 809 generates the PRECHARGE signal, which is used in precharging the integrators 510a and 512a.

Another set of important control functions is performed by the offset control circuits 812–814. These circuits include a clocked switch 812, and circuits 813–814. The switch 812, in an illustrative embodiment, may comprise a MC14022 circuit. The switch 812 provides an output 818 that is directed to a clock input of the circuit 813. The circuit 813, in an illustrative embodiment, may comprise a flip-flop such as a model MC14013 circuit.

The circuit 813 functions to provide the $OFFSET_{206}$ signal, and the circuit 814 provides the $OFFSET_{204}$ signal. The circuit 814 additionally includes operates to aid in selectively limiting the current through the power supply circuit 550. As explained in greater detail below, the circuit 814 controls a current limiting circuit 828 that selectively interconnect terminals 838 and 840 to short out a current limiting resistor 1106 (FIG. 11).

Figure 9A:
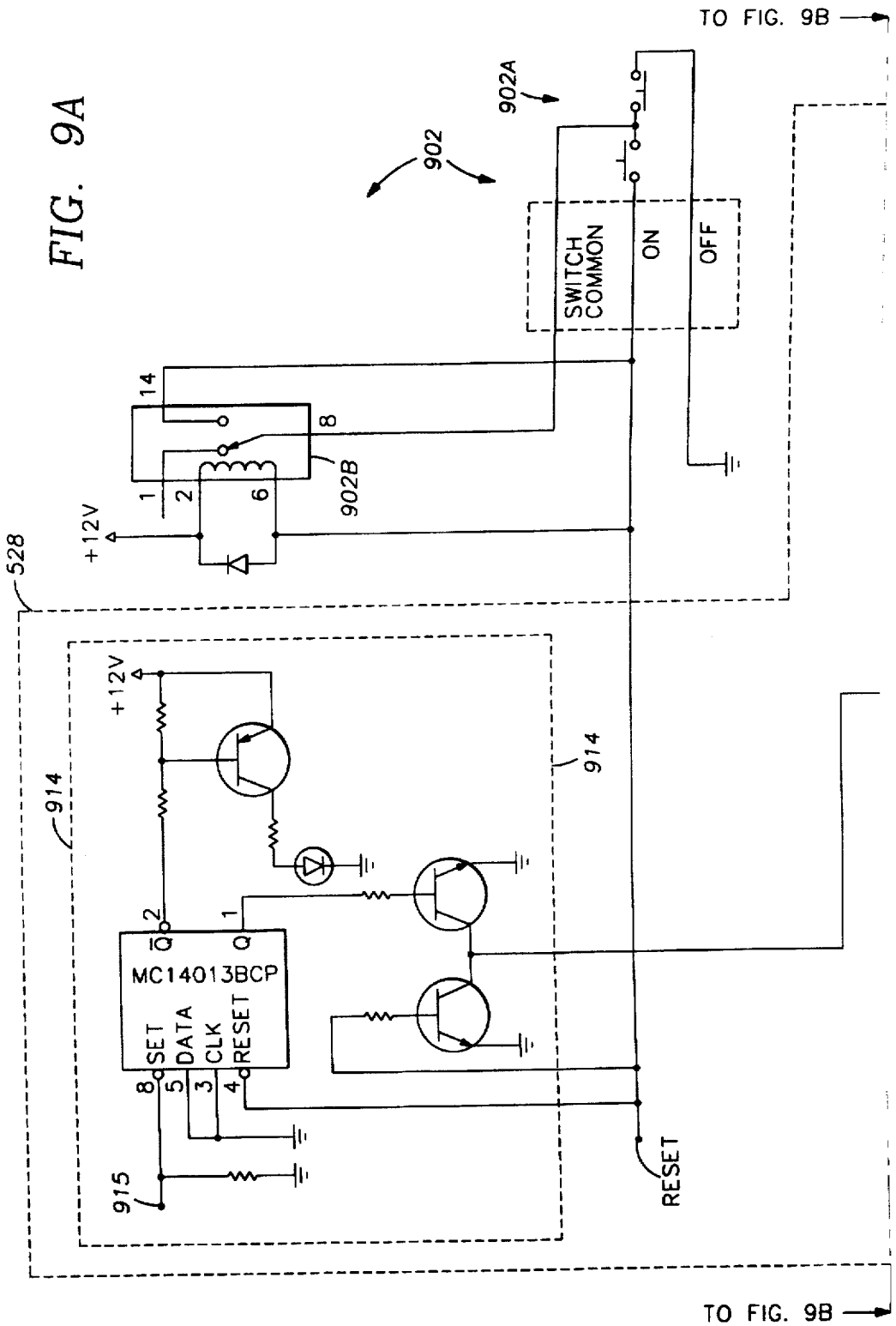
FIGS. 9A and 9B are detailed schematic diagrams of a supply voltage controller 528 of the invention.
Figure 9B:
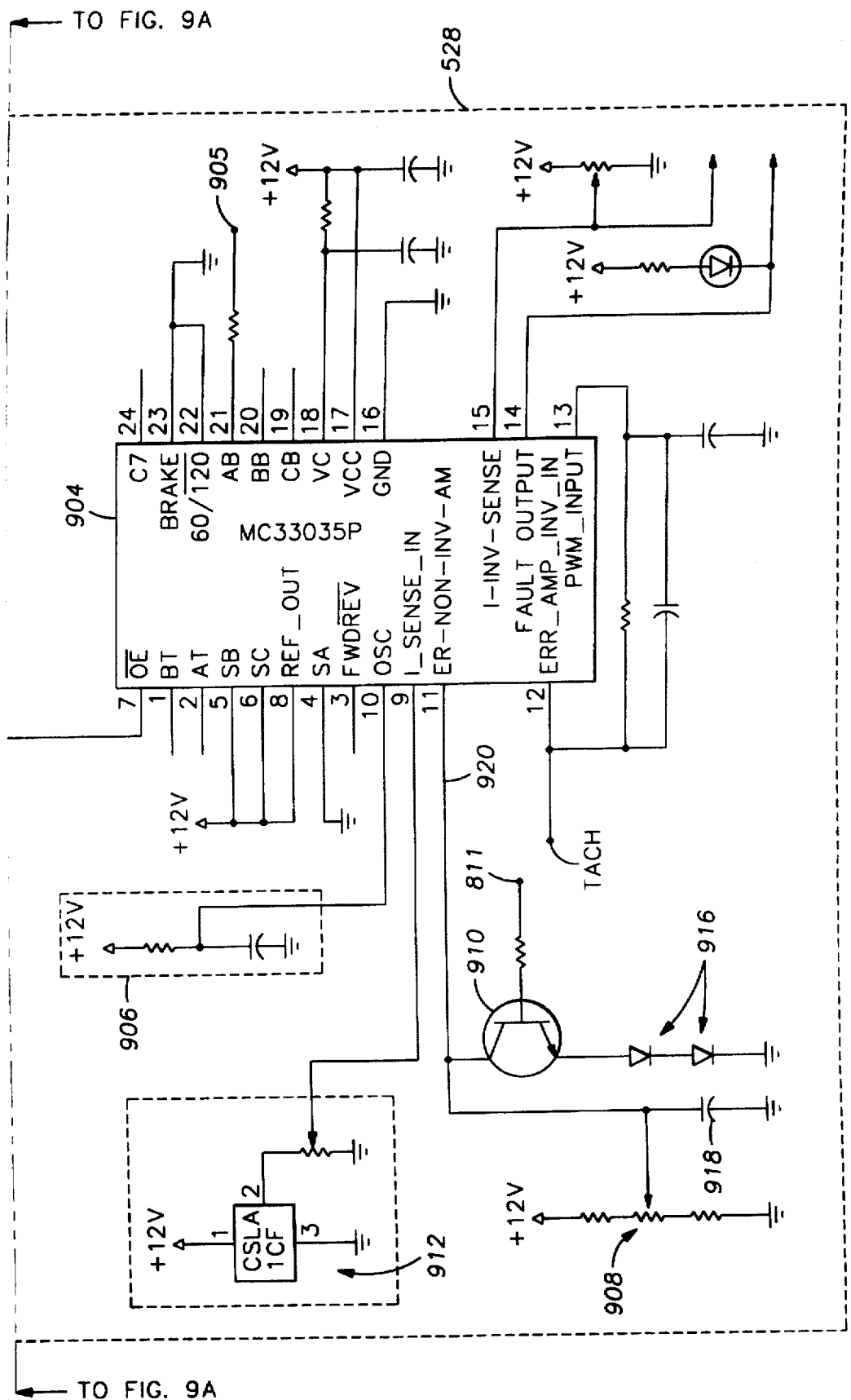

Referring to FIGS. 9A–9B, the invention also includes a start switch 902. The switch 902 may comprise a pushbutton console 902a and a relay 902b such as a D1C12H circuit. The switch 902 operates to selectively connect a RESET line to ground, thereby resetting various circuits of the invention and placing the motor in the startup mode.

Still referring to FIGS. 9A–9B, the supply voltage controller 528 includes a circuit 904, which may comprise a MC33035P motor control circuit. The circuit 904 provides a signal on a PWM control line 905 to control operation of the pulsewidth modulator 556, as explained in greater detail below. The circuit 904 is connected to a number of peripheral circuits. For example, a circuit 906 helps establish the frequency of the pulsewidth modulation that is performed by the modulator 556 under control of the circuit 904.

Additionally, a potentiometer 908 and a transistor 910 provide a reference voltage on a line 920. The circuit 904 uses the reference voltage on line 920 to regulate the voltage across the busses 110, 112 during the startup mode. The wiper of the potentiometer 908 is electrically connected to the line 920, and also connected to ground via a capacitor 918. The collector of the transistor 910 is connected to the line 920. Also, the emitter of the transistor 910 is connected to electrical ground via a pair of diodes 916, which assist in controlling the voltage on the line 920.

Also, an over-current compensator 912 is provided to detect the current supplied by the power supply circuit 550 and to provide a corresponding signal to the circuit 904, so that the circuit 904 may disable the power supply circuit 550 if the current is excessive. The over-current compensator 912 may serve the bus current by employing a ferrite donut 1100 (FIG. 11) containing a Hall effect device, through which the bus 110 passes. An illustrative Hall effect device is a model HF1CSLA1CF device.

The controller 528 also includes a modulator protection circuit 914 to selectively shut down the voltage circuit 904 when excessive current is detected in the pulsewidth modulator 556. Preferably, a gate driver (not Shown) is utilized to detect the current through the pulsewidth modulator 556 and provide an appropriate signal to line 915 when the current is excessive. The circuit 914 may employ a model MC14013BCP circuit, and the gate driver may comprise a Fuji model EXB850 circuit. The gate driver also functions to convert input signals received from the voltage controller 528 and the commutation master circuit 530 into signals sufficient to drive the commutation transistors X1–Z2 and the pulsewidth modulator 556.

Figure 10A:
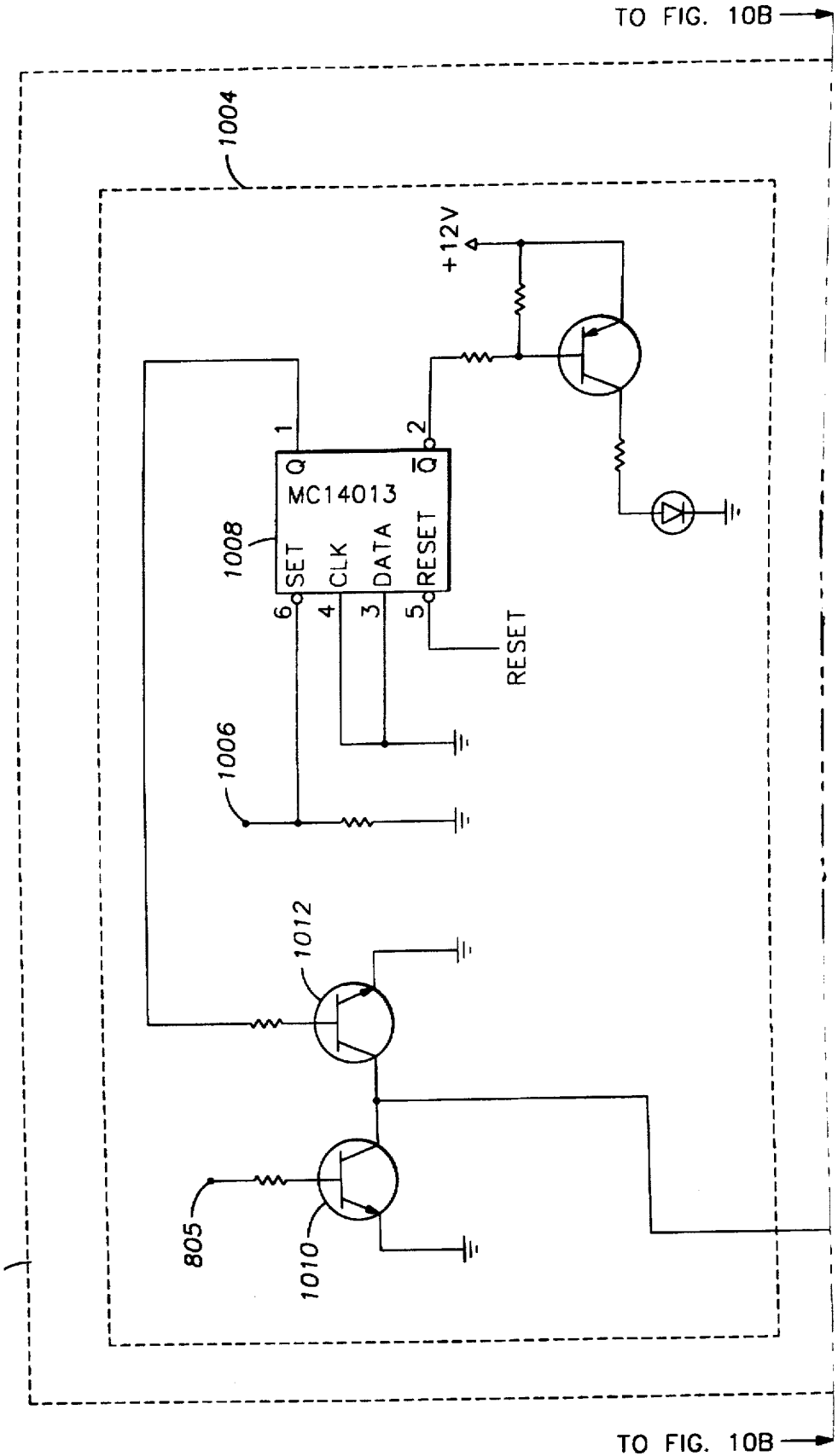
FIGS. 10A and 10B are detailed schematic diagrams of a commutation master circuit 530 of the invention.
Figure 10B:
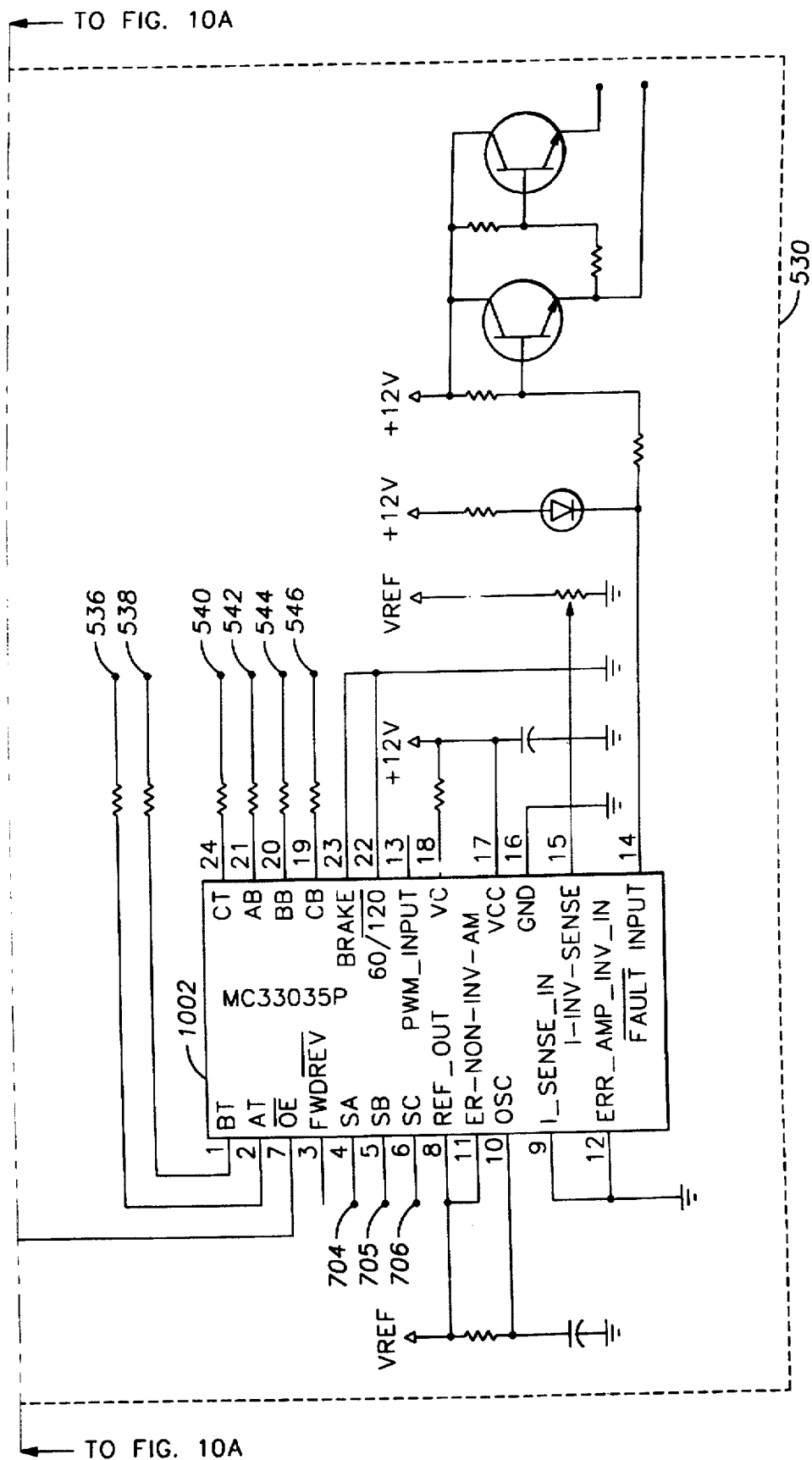

Referring to FIGS. 10A–10B, the commutation master circuit 530 controls the switching of the commutation transistors X1–Z2 by providing the appropriate outputs 536, 538, 540, 542, 544, and 546. The commutation master circuit 530 includes a circuit 1002, which in an illustrative embodiment comprises a MC33035P motor control circuit. The circuit 1002 is connected to biasing and control circuitry, which includes various peripheral electrical components that configure the circuit 1002 properly to orchestrate the gating of the commutation transistors X1–Z2. The MC33035P circuit is manufactured and publicly sold by Motorola Inc. for the purpose of gating commutation transistors. Therefore, the operation and biasing of the MC33035P circuit in accordance with the invention is not discussed further, since these procedures are apparent to one of ordinary skill in the art having the benefit of this disclosure.

The commutation master circuit 530 also includes a transistor disabler 1004 to selectively disable commutation of the transistors X1–Z2 when the gate driver determines that the current through one or more of the transistors X1–Z2 is excessive. Preferably, the gate driver (not shown) is utilized to detect the current through the commutation transistors X1–Z2 and provide an appropriate signal to line 1006 when the current through any transistor X1–Z2 is excessive. The disabler 1004 includes a circuit 1008, which may comprise a model MC14013BCP circuit. In addition, each transistor X1–Z2 may include a reverse biasing diode (not shown) to prevent damage by dissipating excess voltage from the transistor X1–Z2.

Referring to FIG. 11, an illustrative embodiment of the power supply circuit 550 of the invention will be described in greater detail. In this embodiment, the rectifier 554 comprises six diodes and a capacitor, receives a three-phase power signal from the voltage sources 552, and produces a D.C. voltage across the busses 110, 112. In oilfield and other industrial applications, three-phase power is typically provided by the local power company. However, if a power supply is available to provide satisfactory D.C. voltages, such power supply may be utilized directly in lieu of the rectifier 554.

The pulsewidth modulator 556 preferably includes a modulating bipolar junction power transistor and other electrical components arranged to create a chopped waveform such as a rectangular wave. The transistor's gate is electrically connected to the PWM control line 905 via the gate driver (not shown) so that the supply voltage controller 528 is able to selectively trigger the pulsewidth modulator 556. The transistor may be shunted by a reverse biasing diode, which turns on when the transistor experiences any reverse bias to prevent damage to the transistor by dissipating potentially damaging voltages.

The filter 558 includes a diode 1102, an inductor 1104, a current limiting resistor 1106, a pair of resistors 1108, 1112, and a pair of capacitors 1110, 1114. These elements are preferably arranged to smooth the chopped waveform of the pulsewidth modulator 556 into a D.C. waveform. Hence, the level of smoothed D.C. voltage across the busses 110, 112 may be selected by selectively triggering the transistor of the modulator 556.

The filter 558 additionally includes the ability to selectively limit current through the bus 110, by introducing the resistor 1106 into the circuit. This is accomplished, as described above, when the relay 836 (FIG. 8B) electrically isolates the terminals 838,840. When the relay 836 is activated, the terminals 838, 840 are connected, and the resistor 1106 is shorted out. The resistor 1106 is preferably sized to dissipate a significant amount of power and may, in an illustrative embodiment, comprise a high-current, 3Ω resistor. As explained in greater detail below, only after the starting sequence in completed is the relay 836 activated and the terminals 838, 840 of the resistor 1106 shorted.

The snubber 562 comprises a diode and a resistor in parallel, arranged in series with a capacitor, to reduce transient voltages across the busses 110, 112; such transient voltages might be caused, for example, by the switching of the commutation transistors X1–Z2.

OPERATION

1. General Operation

In operation, the electric motor 30 (as shown in FIG. 15) is operated by the application of electrical current through the cable 34 to the motor windings 36. The motor shaft or rotor 40 is then rotated, as will be described in detail below, to drive the rotary pump 18. Specifically, the wellbore fluids are drawn into the pump inlet 16 by the rotation of the pump's internal devices, such as a helical rotor in a progressive cavity pump or a plurality of centrifugal pump stages within a centrifugal pump. Wellbore fluids are then moved out of the pump's outlet 20 and into a tubing 22 for transport to the earth's surface for processing.

While the motor is operating normally, the control circuits 508, 510, and 512 provide electrical signals resembling those that would be received from Hall effect sensors. Specifically, the control circuit 508 creates a SIM-HALL$_{202}$ signal that simulates the Hall output 202. Likewise, the control circuits 510, 512 create SIM-HALL$_{206}$ and SIM-HALL$_{204}$ signals that simulate the Hall outputs 206 and 204, respectively. The SIM-HALL signals are directed, via the switch 522, to the commutation master circuit 530, which interprets these signals and applies power to the gates of the appropriate transistors X1–Z2 accordingly.

Figure 3:
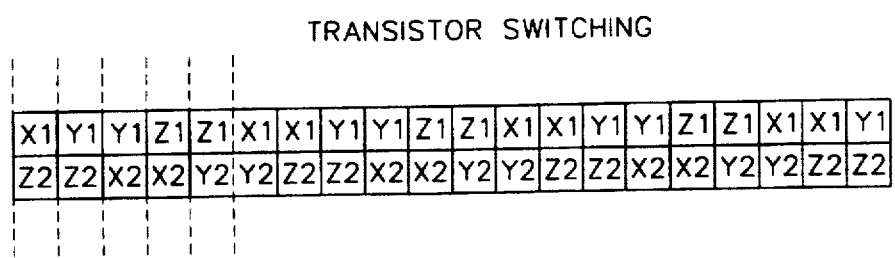
FIG. 3 is a diagram illustrating the timing sequence of switching transistors used to control the motor of FIG. 1.
Figure 4:
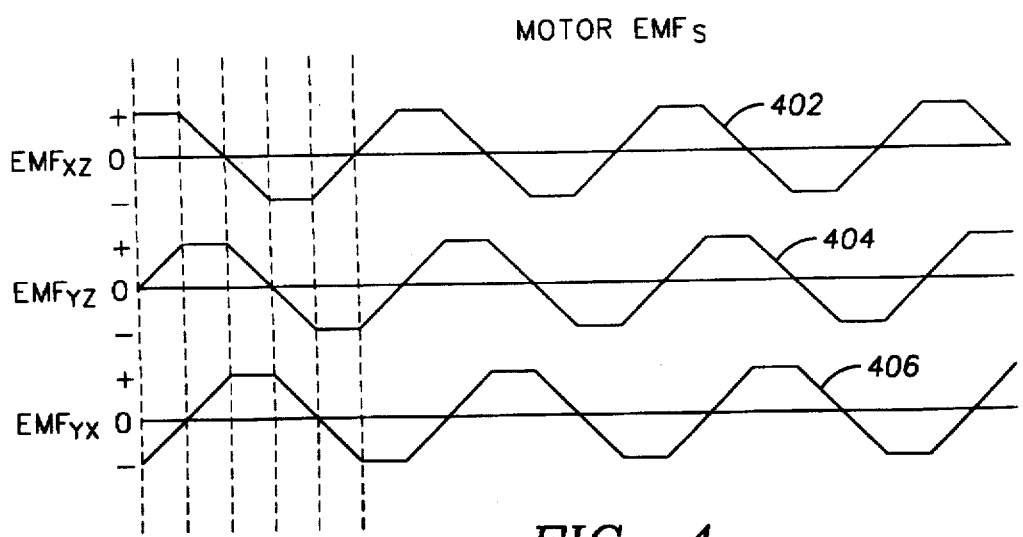
FIG. 4 is a graph illustrating the winding EMFs of a typical brushless D.C. motor during its operation.

More specifically, the commutation master circuit 530 provides outputs 536, 538, 540, 542, 544, and 546, which are electrically coupled to the gates of the transistors X1, Y1, Z1, X2, Y2, and Z2, respectively. As an example of the operation of the commutation master circuit 530, if the commutation master circuit 530 were to receive information from the switch 522 resembling the Hall effect outputs 202, 204, and 206 in the interval 252 (FIGS. 2–3), the commutation master circuit 530 would apply gate voltages to the transistors Y1 and Z2.

The signal from the winding tachometer 708 provides the controller 528 with an electrical signal representative of the rotor's rate of revolution. The controller 528 utilizes the signal from the tachometer 570 in providing input to the pulsewidth modulator 556 to regulate the voltage applied to the busses 110, 112 across of the transistors X1–Z2. The ongoing operation of the motor is referred to as the "brushless D.C. mode."

The initial startup of the motor, called the "startup mode" is controlled in a different manner. In particular, after the voltage across the busses 110, 112 has increased to a certain level (e.g., 100 V), the mode control circuits 806–808 and offset control circuits 812–814 begin to effectuate the startup mode, which leads into the brushless D.C. mode. First, the integrators 508a, 510a, 512a are precharged. At this time, the commutation master circuit 530 does not receive input from the control circuits 508, 510, 512. Instead, the switch 522 directs preset startup voltages to the commutation master circuit 530. Specifically, the switch 522 provides signals of 0 V, +12 V, and +12 V on the outputs 704, 705, and 706, respectively. This has the effect of aligning the rotor in a desired "home" position with respect to the stator. Also at this time, the supply voltage controller 528 receives input from the position initiator 802 to assist in regulating the voltage across the busses 110, 112. Also, the relay 836 is activated to electrically disconnect the terminals 838, 840 and effectively introduce the resistor 1106 into the power filter 558. This limits the amount of current passing through the busses 110, 112, and decreases the initial stress placed on the transistors X1–Z2 and the windings 102, 104, 106.

Next, the switch 522 is tripped, directing the output of the winding tachometer 708, instead of the position initiator 802, to the commutation master circuit 530. Also, as a result of tripping the switch 522, the outputs of the control circuits 508, 510 and 512 are directed to the commutation master circuit 530. This causes the commutation transistors X1–Z2 to be gated.

Additionally, the circuit 808 influences the voltage controller 528 to assist in regulating the length of pulses provided by the pulsewidth modulator 556. Then, the offset correctors 510b, 512b are enabled at appropriate times. About this time, the relay 836 is deactivated to short out the current limiting resistor 1106.

2. Detailed Operation

Figure 12:
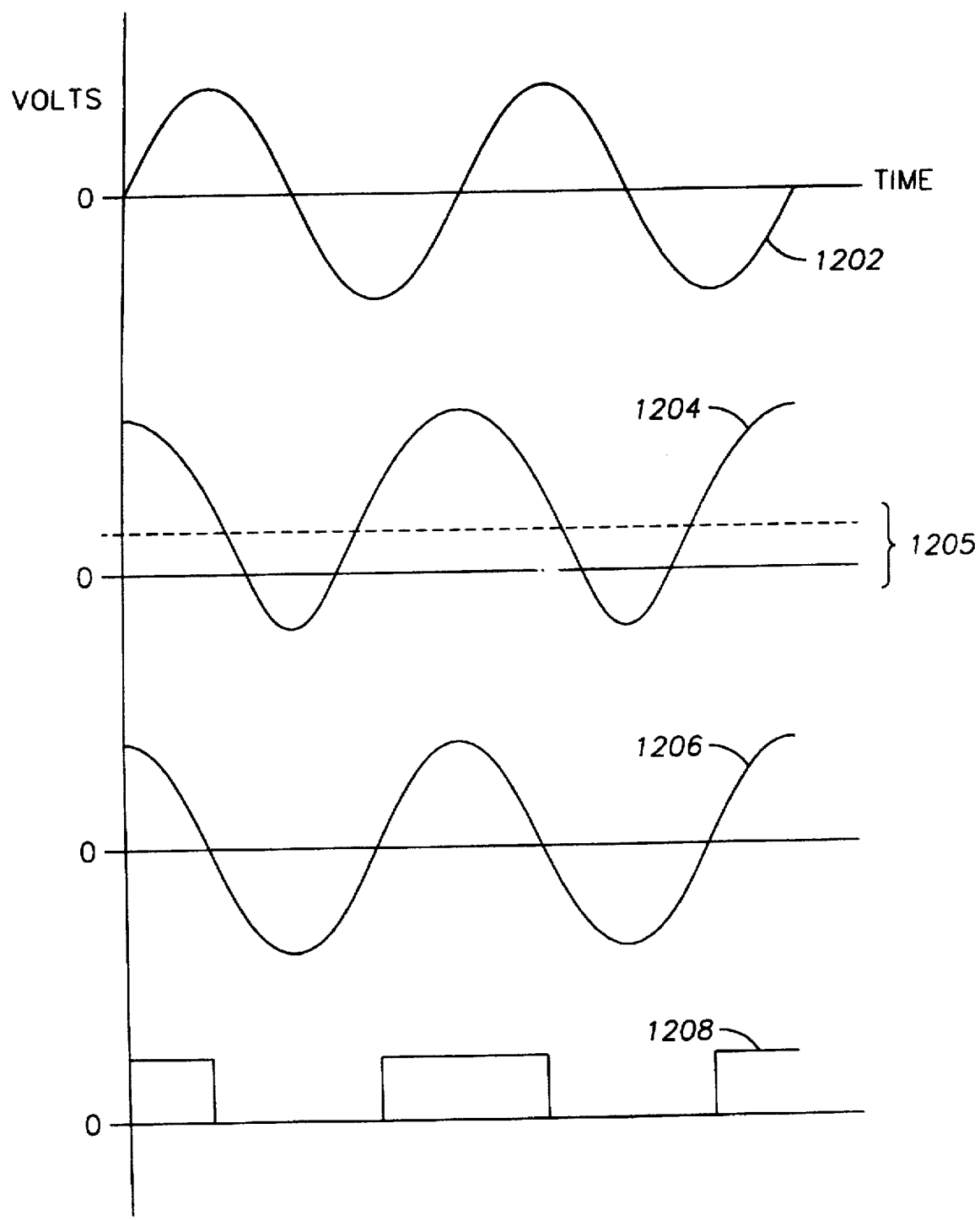
FIG. 12 is a graph illustrating operation of the control circuit 510 of the present invention.
Figure 13:
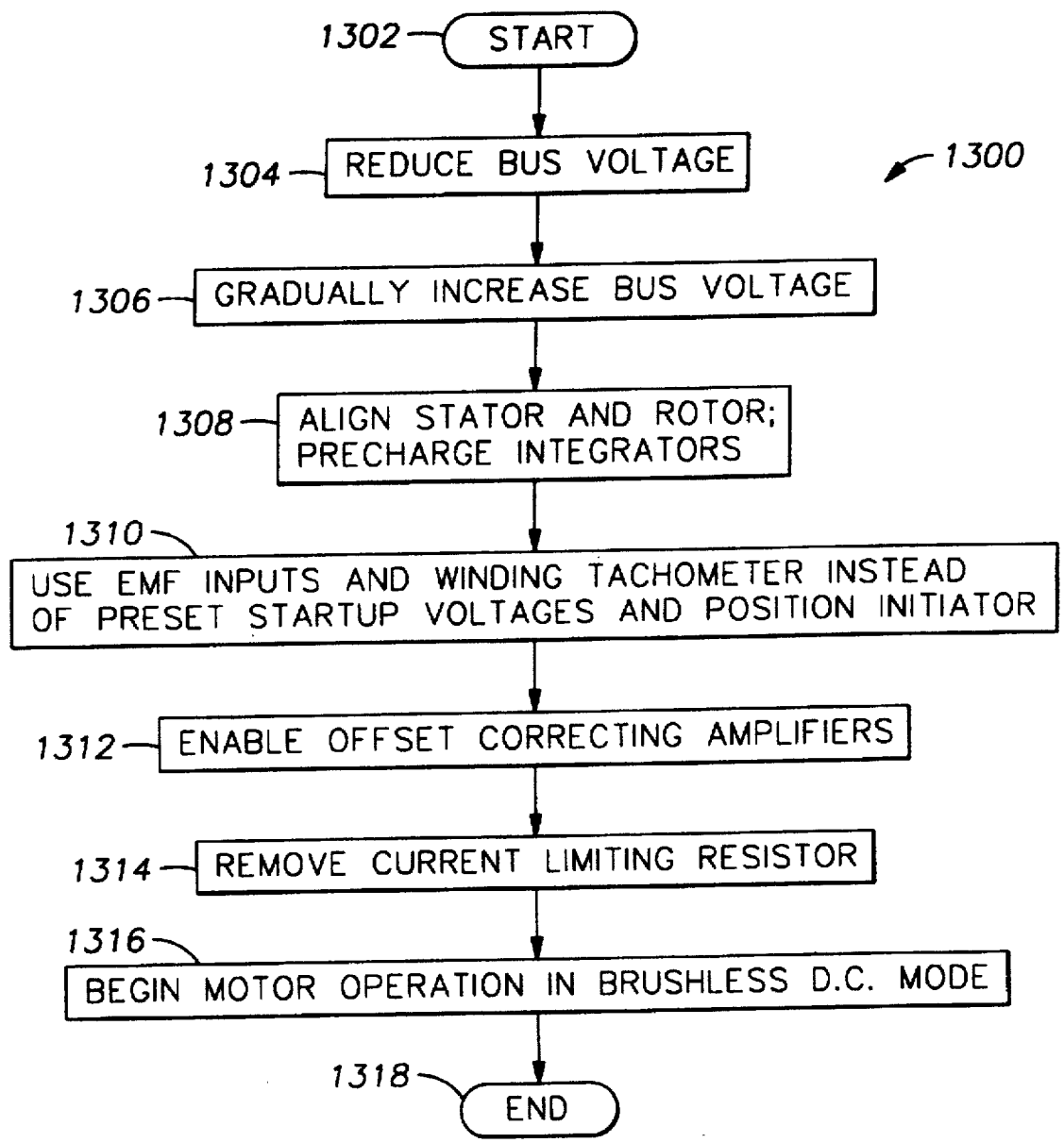
FIG. 13 is a flowchart illustrating the overall operation of the present invention.

Having described the operation of the invention in general terms, a more detailed explanation will be made, with reference to FIGS. 12–14. FIG. 13 depicts an exemplary operating sequence of the invention, including a number of tasks 1300 shown in order of their execution. In the illustrated embodiment of the invention, the tasks 1300 are performed by the circuitry shown in FIGS. 5A–11 without any need for microprocessor or other intelligent control. However, it is understood that an ordinarily skilled artisan, having the benefit of this disclosure, may choose to implement some or all of the control and timing functions of the invention with one or more microprocessors, instead of using circuit components such as flip-flops, counters, switches, and other circuits depicted in the illustrated embodiment.

The sequence 1300 is begun in task 1302 when a user trips the switch 902 by depressing the push-button console 902a, thus initiating the startup mode. More specifically, this drives the RESET line low, as indicated by 1402 (FIG. 14), and resets the protection circuit 914 and the mode control circuits 807–808. Resetting the protection circuit 914 ensures that the circuit 914 will not inadvertently shut down the circuit 904.

Also, by resetting the mode control circuit 808, its Q output (i.e. the CONTROL signal) goes low. This causes the switch 522 to connect startup-related circuitry to the voltage controller 528 and commutation master circuit 530. Specifically, the position initiator 802 and preset startup voltages are connected to the buffer 702.

Another event that occurs when the RESET line goes low is the resetting of the mode control circuit 807. When this occurs, the output 805 (i.e. Q') goes high. This gates a transistor 1010 (FIG. 10A), causing the collector of the transistor 1010 to go low, thereby disabling the commutation master circuit 530 by shutting down the circuit 1002.

Also as a result of the reset, the voltage across the busses 110, 112 is momentarily reduced, as depicted in task 1304 (FIG. 13). Specifically, when the RESET line goes low, the Q' output of the circuit 808 goes low; accordingly, the Q' output (i.e., line 811) goes high, and the transistor 910 is gated. When the transistor 910 is gated, the voltage on the line 920 is forced low. One of the functions of the circuit 904 is to measure the difference between the inputs on the line 920 and the TACH line, and gate the pulsewidth modulator 556 with a greater or lesser cycle, as needed, to make the voltages on the TACH line and the line 920 equal. For example, when the voltage on the line 920 is greater than the TACH line, this means that the motor is rotating too slow, and the circuit 904 will gate the pulsewidth modulator 556 with a greater duty cycle to increase the voltage across the busses 110, 112.

Accordingly, during the startup mode, the voltage on the line 920 is about 1.2 V due to the diodes 916, so the circuit 904 will gate the pulsewidth modulator 556 as needed to increase the POS-INIT signal, which is provided to the TACH line, to about 1.2 V. Specifically, when the output of the position initiator 802 (i.e., the POS-INIT signal) indicates a low voltage across the busses 110, 112, the circuit 904 will gate the pulsewidth modulator 556 with a greater duty cycle. In task 1306, the bus voltage gradually increases, causing the signal from the position indicator 802 to gradually increase. This occurs since the voltage across the capacitor 918, which is initially zero, slowly allows increases the reference voltage on line 920 to the level preset by the potentiometer 908. This preset level corresponds to the motor's desired operating speed. Accordingly, the circuit 904 will gate the pulsewidth modulator 556 less and less until the voltages at the line 920 and the TACH line are equal.

However, until the bus voltage reaches the predetermined level (determined by the potentiometer 804a), the voltage across the busses 110, 112 is insufficient to trigger the circuit 808 to switch the motor into brushless D.C. mode. When the voltage across the busses 110, 112 reaches the predetermined level (1405, FIG. 14), the mode control set circuit 804 continuously sets the circuit 806, forcing the output of the circuit 806 to a high value (1406, FIG. 14). More specifically, when the circuit 804 determines that the signal provided by the position initiator 802 has met a selected voltage level established by a potentiometer 804a, the circuit 804 sets the circuit 806.

Figure 14:
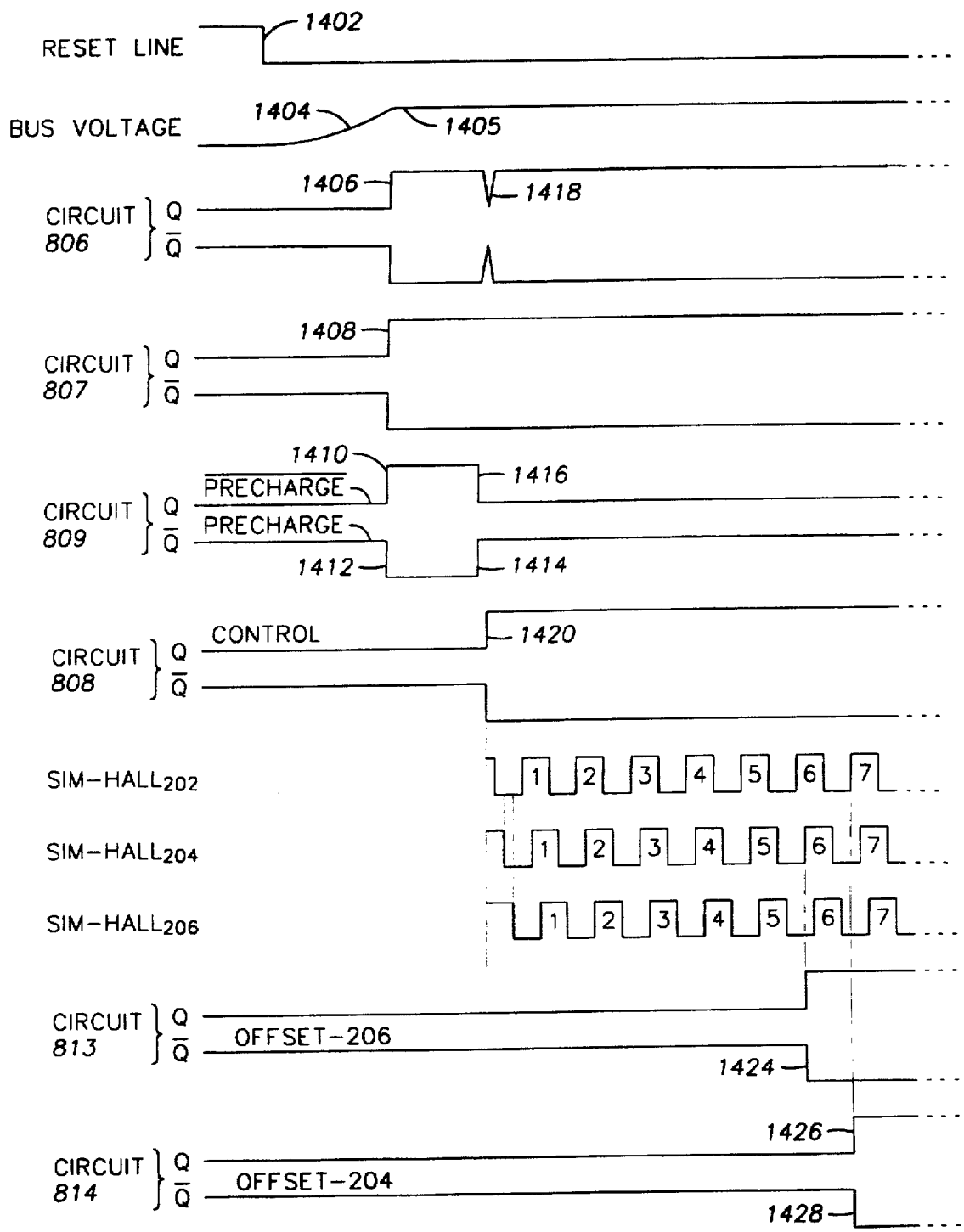
FIG. 14 is a timing diagram illustrating the operation of various components of the present invention.

When the circuit 806 is set, it causes the circuit 807 to be set (1408, FIG. 14). This forces the output line 805 low; accordingly, the transistor 1010 is no longer gated, and the circuit 1002 is permitted to begin gating the commutation transistors X1–Z2.

Therefore, as shown in task 1308 (FIG. 13), the stator and rotor are aligned in the predetermined home position, as a result of the preset startup voltages that are already being provided to the commutating master circuit 1002 via the switch 522. More specifically, since the circuit 808 is providing a CONTROL signal that is low, the switch 522 feeds the preset startup voltage to the buffer 702. During this time, the switch 522 also directs the POS-INIT signal to the TACH line, which prevents the supply voltage controller 904 from raising the bus voltage excessively while the motor is being positioned. As a result, the stator and rotor are effectively aligned in the predetermined "home" position.

Another event that occurs in task 1308 (FIG. 13) is the precharging of the integrators 510b, 512b. This occurs because the setting of the circuit 807 in turn sets the circuit 809, forcing the output line 809a of the circuit 809 high (1410, FIG. 14). This turns on a transistor 809b, and brings the PRECHARGE line low (1412, FIG. 14). The integrators 510b, 512b are only precharged in task 1308 for a predetermined period, since the PRECHARGE line only remains low for a given duration (1414, FIG. 14). The high voltage on the line 809a slowly charges a capacitor 809d, which eventually brings a node 809c high enough to reset the circuit 809. When the circuit 809 is reset, the output line 809a goes low (1416, FIG. 14), and the PRECHARGE signal goes high again (1414, FIG. 14). The capacitor 809d is preferably sized to provide a sufficiently long precharging period to fully charge the integrators 510b, 512b to the appropriate supply voltages, e.g. +12 V or −12 V. Alternatively, however, the integrators 510b, 512b may be precharged to greater or lesser voltage levels, instead of +12 V and −12 V.

When the circuit 809 is reset, its Q' output (i.e., line 809e) resets the circuit 806. This causes Q' output of the circuit 806 to briefly go high and then low again (1418, FIG. 14), since the circuit 806 is continuously set by the mode control set circuit 804. However, the transition of the Q' output clocks the circuit 808, causing the CONTROL signal to go high (1420, FIG. 14). The CONTROL signal, as mentioned above, triggers the switch 522, thereby disconnecting the preset startup voltages from the buffer 702, and connecting the outputs of the control circuits 508, 510, and 512 instead. This event is illustrated in task 1310 (FIG. 13). Also, the winding tachometer signal (W-TACH), instead of the position initiator signal (POS-INIT), is directed to the TACH input of the circuit 904.

At this time, the Q' output (i.e., line 811) of the circuit 808 resets the circuit 812, which begins counting clock cycles provided by the SIM-HALL$_{202}$ signal. When six cycles are received, the circuit 813 is clocked in synchronization with a high-going transition of the SIM-HALL$_{202}$ signal. This effectively drives the output line 820 low (1424, FIG. 14); accordingly, the OFFSET$_{206}$ signal, provided by the output 820, is also driven low.

This results in resetting of the circuit 814, in synchronization with the high-going transition of the SIM-HALL$_{206}$ signal. This effectively drives the output line 827 high (1426, FIG. 14), driving the OFFSET$_{204}$ signal low (1428, FIG. 14).

When the OFFSET$_{204}$ and OFFSET$_{206}$ signals go low, the offset correcting amplifiers 612, 626 are enabled. Initially, it is desirable to disable the offset correcting amplifiers 612, 626 since the integrators 510a, 512a are precharged, and the offset correcting amplifiers 612, 626 would counteract the precharging. However, the OFFSET$_{204}$ and OFFSET$_{206}$ signals are brought low when needed to facilitate the motor's ongoing operation, as discussed above. The activation of the offset correcting amplifiers 612, 626 is depicted by task 1312 (FIG. 13).

It is important that each of the offset correcting amplifiers 612, 626 be enabled when its corresponding SIM-HALL is low. As discussed above and illustrated in FIG. 14, the raising of the OFFSET$_{204}$ signal synchronized with the SIM-HALL$_{202}$ signal, not the SIM-HALL$_{204}$ signal. Likewise, the raising of the OFFSET$_{206}$ signal synchronized with the SIM-HALL$_{204}$ signal, not the SIM-HALL$_{206}$ signal. This synchronization scheme is used to ensure that the offset correcting amplifiers 612, 626 are not enabled when their respective SIM-HALL signals are high.

When the output 827 of the circuit 814 is brought high, this also has the effect of shorting the resistor 1106. Specifically, the high voltage on the output line 827 turns on the transistor 834, tripping the relay 836 and shorting the terminals 838, 840. The removal of the resistor 1106 is depicted in task 1314 (FIG. 13).

Next, in task 1316 (FIG. 13), the motor begins operating in a brushless D.C. mode. During this mode, the commutation master circuit 530 ensures that the proper transistors are turned on in sequence to rotate the rotor. Also, the pulsewidth modulator 556 governs the rotor's speed of rotation by increasing or decreasing the supply voltage across the busses 110, 112. More specifically, in the brushless D.C. mode the integrator 508a integrates the signal received from the transformer secondary 514a. Accordingly, when the signal received from the secondary 514a is a sinusoid (e.g., curve 1202, FIG. 12), the integrator 508a produces a second sinusoid (curve 1204) with a phase displacement of 90°.

The signal produced by the integrator 508a is directed to the offset corrector 508b, which operates to eliminate any D.C. offset 1205 of the sinusoid 1204; in other words, the offset corrector 508b helps ensure that half of the sinusoid is above zero volts and half is below zero volts. Accordingly, the zero-crossover points of the offset-corrected sinusoid 1206 will then correspond to the minimums and maximums of the first sinusoid 1202. The offset-corrected signal 1206 from the offset corrector 508b is directed to the crossover detector 508c, which produces a square wave 1208 having a positive voltage when the offset corrected signal is positive, and having zero voltage when the offset corrected signal is less than zero. This signal 1208 is representative of the signal that would be provided by a Hall effect sensor coupled across the windings 104, 106; the signal 1208 is present on an output line that is called SIM-HALL$_{206}$, since the signal 1208 is responsive to the winding EMF between the nodes X and Z.

During the brushless D.C. mode, the output SIM-HALL$_{206}$ is directed via the switch 522 to the winding tachometer 708 and the commutation master circuit 530. The commutation master circuit 530 regulates the switching of all six transistors X1–Z2 according to a selected algorithm, such as the routine depicted in FIG. 3. Furthermore, the circuit 904 receives the output from the tachometer 904, and utilizes this signal in regulating the gating of the pulsewidth modulator 556. Specifically, the Q' output (i.e., line 811) of the circuit 808 is low, as explained above during the brushless D.C. mode. Therefore, the transistor 910 is not gated, and the input to the line 920 is fixed by the potentiometer 908. Accordingly, the pulsewidth modulator 556 is gated by the circuit 904 to minimize the difference between the voltage provided by the potentiometer 908 and the voltage supplied to the TACH input by the winding tachometer 708. In an illustrative embodiment, the pulsewidth modulator 556 may be modulated at about 8 KHz.

The circuit 904 also regulates the pulsewidth modulator 556 in response to the input provided by the over-current compensator 912. The over-current compensator 912 provides an output in proportion to the current passing through the busses 110, 112. Thus, the circuit 904 is able to limit gating of the pulsewidth modulator when the over-current compensator 912 detects excessive current through the busses 110, 112. Moreover, if the gate driver determines that the current through the pulsewidth modulator 556 itself is excessive, a signal is provided to the line 915 of the protection circuit 914, causing the protection circuit 914 to completely disable the circuit 904. Additionally, if the gate driver measures an excessive current in any of the commutation transistors X1–Z2, the circuit 1008 is set via line 1006, and the transistor 1012 is gated to effectively disable the circuit 1002. The brushless D.C. mode continues until the motor is shut down in task 1318.

Conclusion

The present invention offers a number of advantages to its users. For instance, the motor of the invention provides a high level of torque in relation to the level of current used by the motor. This is accomplished, at least in part, by precharging the integrating amplifiers 608, 622 to provide simulated Hall signals that correspond to the initial alignment of the stator and rotor. High torque is also encouraged by carefully timing the connection of the integrating amplifiers 608, 622 to their respective windings 518, 516. Unlike prior arrangements using wye-connected windings, the invention does not require any interconnection with the central node of the wye known as the "neutral" wire. Also unlike prior arrangements, the invention is advantageous since, immediately after positioning, it may be started in a brushless D.C. mode.

Additionally, the invention is not as susceptible to problems caused by heat since all of the electronics of the invention may be located remotely from the motor. Instead of using position sensors such as Hall effect sensors, which must be located with the motor, the invention utilizes the control circuits 508, 510 and 512, which may be remotely located, to simulate the output that would normally be received from Hall effect sensors.

Furthermore, only three electrical power cables are required to interconnect the electric motor to the circuitry of the invention. No other wires or cables are needed, since the transformers 514, 516, 518 may be connected directly to the power cables or the commutation transistors X1–Z2, rather than the windings 102, 104, 106. This is in contrast to arrangements that utilize rotor position sensors, which necessarily require five or more wires and three power cables connected to the motor.

Due to these advantages, a control system constructed according to the invention is especially useful for operating a remotely located electric motor. For example, the invention is particularly well suited for operating a downhole electrical pumping motor. The invention is also useful in when utilized in other applications a wide variety of other contexts as well. While there have been shown what are presently considered to be preferred embodiments of the invention, it will be apparent to those skilled in the art that various changes and modifications can be made herein without departing from the scope of the invention as defined by the appended claims.

What is claimed is:

1. A motor, comprising:
   a) a three-phase brushless electric motor including first, second, and third stator windings and a permanent magnet rotor;
   b) an array of commutation transistors electrically connected to the windings;
   c) three transformers, wherein each transformer includes a primary coil and a secondary coil, and the primary coil of each transformer is electrically coupled across at least one of the windings;
   d) first, second, and third control circuits, each control circuit being connected to a different transformer to providing timing signals to simulate a Hall effect signal corresponding to the EMFs of that winding, wherein each control circuit includes an integrator to integrate signals received from the corresponding transformer, an offset corrector to remove any direct current voltage from the integrated signal, and a crossover detector to provide an output that changes state in response to the integrated, offset-corrected signal passing through zero;
   e) first and second mode control circuits for selectively precharging two or more of the control circuits prior to rotation of the rotor;
   f) first and second offset control circuit for selectively disabling the offset correctors of the precharged control circuits prior to rotation of the rotor; and
   g) a commutation control circuit, to align the stator and rotor in a predetermined home position in response to preset voltage levels prior to rotation of the motor, and to initiate and sustain rotation of the rotor at a selected time by applying power to gates of the commutation transistors in response to the timing signals from the control circuits.

2. The motor of claim 1, wherein the windings are arranged in a wye configuration.

3. The motor of claim 1, wherein the windings are arranged in a delta configuration.

4. The motor of claim 1, wherein the first and second mode control circuits include electrical relays.

5. The motor of claim 1, wherein the first and second offset control circuits include electrical relays.

6. The motor of claim 1, further comprising a mode control circuit to selectively provide the commutation control circuit with preset voltages or signals from the control circuits.

7. The motor of claim 1, wherein the commutation control circuit comprises a circuit that selects two of the commutation transistors in response to the timing signals and applies electrical power to the gates of the selected transistors for a selected interval.

8. The motor of claim 1, further comprising three power cables electrically interconnecting the commutation transistors and the windings.

9. The motor of claim 8, wherein the motor is located downhole in a well and the commutation transistors, transformers, control circuits, and commutation control circuit are positioned above the earth's surface.

10. The motor of claim 1, further comprising a voltage controller to regulate the magnitude of voltage applied to the windings in response to the speed of the motor's rotation.

11. The motor of claim 1, further including a current limiting circuit to selectively limit current through the busses prior to rotation of the motor.

12. The control system of claim 1, wherein each of the offset control circuits is operative to disable the offset corrector of a given control circuit when the timing signal of the given control circuit is in a predetermined state.

13. The control system of claim 1, wherein the first and second mode control circuits operate to precharge the integrators of the first and second control circuits to a predetermined level.

14. The control system of claim 1, further including circuitry to regulate the voltage across the busses in response to the speed of rotation of the motor.

15. A method for controlling a brushless D.C. motor having a stator, first, second, and third stator windings, an array of commutating transistors coupled to said stator windings, said array operable under control of at least three commutation control circuits, to provide power from a pair of busses to said windings, and a permanent magnet rotor, said method comprising steps of:

a) providing a first level of voltage across said pair of busses;

b) providing preset voltages to said commutation control circuits to gate selected commutating transistors in said array to align the stator and rotor in a predetermined home position;

c) presetting outputs of at least two of said at least three control circuits, each control circuit being coupled to a different winding and operative when not preset to provide timing signals corresponding to a simulated Hall effect signal corresponding to the EMF of that winding; and d) commencing operation of the motor as a brushless D.C. motor by increasing said voltage across said pair of busses from said first level to a second level, removing the preset voltages from the commutating control circuit, and instead providing the commutating control circuit with outputs from the three control circuits wherein said step (c) further comprises the step of obtaining a sample of EMF of at least one of said windings and integrating said sample to generate said simulated Hall effect signal.

16. The method of claim 15, wherein each control circuit, when not preset, performs steps of:

(1) using an integrator to integrate signals received from the stator windings;

(2) using an offset corrector to remove direct current offset from the integrated signal; and (3) detecting the zero crossover points of the offset-corrected signal and providing an output that changes state in response to such crossover points.

17. The method of claim 16, wherein the presetting in step (b) comprises steps of precharging the integrators of two given control circuits and disabling the offset correctors of the given control circuits.

18. The method of claim 17, wherein the precharging is performed for a predetermined period and then discontinued.

19. The method of claim 17, comprising a step of re-enabling each disabled offset correctors when the timing signal of the control circuit associated with that disabled offset corrector is in a predetermined state.

20. The method of claim 15, further comprising steps of regulating the voltage applied to the windings in response to the speed of the motor's rotation.

21. The method of claim 15, wherein said step (d) of commencing operation of the motor as a brushless D.C. motor comprises providing power to said motor on no more than three cables extending from above ground to downhole in an oil well.

22. A method of controlling the rotation of a three phase brushless electric motor having first, second, and third stator windings, an array of commutating transistors coupled to said stator windings, said array operable under control of at least three commutation control circuits to provide power from a pair of busses to said windings, and a permanent magnet rotor, said method comprising:

(a) in a startup mode, performing steps comprising:

1) providing a first level of voltage across said pair of busses;

2) providing preset voltages to said commutation control circuits to gate selected commutating transistors to align the stator and rotor in a predetermined home position;

3) presetting outputs of at least two of three control circuits, each control circuit being coupled to a different winding and operative when not preset to provide timing signals to simulate a Hall effect signal corresponding to the EMF of that winding, wherein the preset outputs correspond to a positional relationship between the stator and rotor immediately after rotation from the home position;

wherein said step (3) further comprises obtaining a sample of EMF of at least one of said windings and integrating said sample to generate said simulated Hall effect signal; and (b) in a brushless D.C. mode, performing steps comprising:

1) sampling the EMF of each winding;

2) producing a three-phase output being conducted on three feedback lines to simulate Hall effect signals corresponding to the sampled EMFs;

3) gating selected commutation transistors in response to the three-phase output; and 4) discontinuing provision of the preset voltages to the commutation control circuit and instead providing the commutating control circuit with the three-phase output.

23. Apparatus for starting a brushless D.C. motor that includes a permanent magnet rotor, a stator, three stator windings, commutation transistors to selectively apply power to the windings to rotate the rotor, and positive and negative busses to supply voltage to the transistors, said apparatus comprising:

a) three transformers, each associated with a stator winding to generate an output signal in response signals generated by the associated stator winding;

b) commutation control circuitry to selectively gate the transistors in response to a commutation input;

c) control circuitry coupled to the transistors and operable in response to the output signals to apply a sequence of voltages on three feedback lines to the commutation input to simulate voltages generated by Hall effect sensors coupled to the rotor during rotation of the motor through a sequence of positions of the rotor relative to the stator; and d) startup circuitry operable prior to rotation of the motor to position the stator and rotor in a first preselected positional relation with respect to each other and to precharge the control circuitry with voltages corresponding to simulated Hall effect voltages generated by Hall effect sensors with the stator and the rotor in a second preselected positional relation while reducing supply voltage available to the commutation transistors from the busses wherein said control circuitry includes integrating circuitry for integrating winding EMF samples to generate simulated Hall effect sensor voltages.

24. An electric submergible pumping system comprising:

a rotary pump having a longitudinal shaft extending therefrom; and a multi-pole brushless electric motor having a stator, stator windings and a permanent magnet rotor, with a first end of the rotor connected to the pump shaft;

commutation transistors to selectively apply power to the windings to rotate the rotor, and positive and negative busses to supply voltage to the transistors three transformers, each associated with a stator winding to generate an output signal in response signals generated by the associated stator winding;

commutation control circuitry to selectively gate the transistors in response to a commutation input;

control circuitry coupled to the transistors and operable in response to the output signals to apply a sequence of voltages on three feedback lines to the commutation input to simulate voltages generated by Hall effect sensors coupled to the rotor during rotation of the motor through a sequence of positions of the rotor relative to the stator; and startup circuitry operable prior to relation of the motor to position the stator and rotor in a first preselected positional relation with respect to each other and to precharge the control circuitry with voltages corresponding to simulated Hall effect voltages generated by Hall effect sensors with the stator and the rotor in a second preselected positional relation while reducing supply voltage available to the commutation transistors from the busses wherein said control circuitry includes integrating circuitry for integrating winding EMF samples to generate simulated Hall effect sensor voltages.

25. An electric submergible pumping system of claim 24 wherein the rotary pump further comprises a multiple stage centrifugal pump.

26. An electric submergible pumping system of claim 24 wherein the rotary pump further comprises a progressive cavity pump.

27. An electric submergible pumping system of claim 24 wherein the electric motor further comprises a three-phase D.C. brushless electric motor.

28. A multi-pole brushless permanent magnet motor system for use with an electrical submergible pumping system, comprising:

an elongated housing;

stator windings disposed within the housing;

a permanent magnet rotor disposed for rotary movement within a longitudinal opening formed within the stator windings; and a first end of the rotor adapted for interconnection with a rotary pump;

commutation transistors to selectively apply power to the windings to rotate the rotor, and positive and negative busses to supply voltage to the transistors three transformers, each associated with a stator winding to generate an output signal in response signals generated by the associated stator winding;

commutation control circuitry to selectively gate the transistors in response to a commutation input;

control circuitry coupled to the transistors and operable in response to the output signals to apply a sequence of voltages on three feedback lines to the commutation input to simulate voltages generated by Hall effect sensors coupled to the rotor during rotation of the motor through a sequence of positions of the rotor relative to the stator; and startup circuitry operable prior to rotation of the motor to position the stator and rotor in a first preselected positional relation with respect to each other and to precharge the control circuitry with voltages corresponding to simulated Hall effect voltages generated by Hall effect sensors with the stator and the rotor in a second preselected positional relation while reducing supply voltage available to the commutation transistors from the busses wherein said control circuitry includes integrating circuitry for integrating winding EMF samples to generate simulated Hall effect sensor voltages.

* * * * *